(12) United States Patent
Hopkins et al.

(10) Patent No.: US 12,329,234 B2
(45) Date of Patent: Jun. 17, 2025

(54) SOLE STRUCTURE WITH CUSTOMIZABLE BLADDER NETWORK

(71) Applicant: NIKE, Inc., Beaverton, OR (US)

(72) Inventors: Timothy P. Hopkins, Lake Oswego, OR (US); Aaron B. Weast, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 333 days.

(21) Appl. No.: 17/533,502

(22) Filed: Nov. 23, 2021

(65) Prior Publication Data

US 2022/0079285 A1 Mar. 17, 2022

Related U.S. Application Data

(62) Division of application No. 15/134,913, filed on Apr. 21, 2016, now Pat. No. 11,206,895.

(51) Int. Cl.

| | |
|---|---|
| *A43B 13/12* | (2006.01) |
| *A43B 13/04* | (2006.01) |
| *A43B 13/18* | (2006.01) |
| *A43B 13/20* | (2006.01) |
| *A43B 13/22* | (2006.01) |
| *B33Y 80/00* | (2015.01) |

(52) U.S. Cl.
CPC ............ *A43B 13/125* (2013.01); *A43B 13/04* (2013.01); *A43B 13/186* (2013.01); *A43B 13/189* (2013.01); *A43B 13/20* (2013.01); *A43B 13/223* (2013.01); *B33Y 80/00* (2014.12)

(58) Field of Classification Search
CPC ..... A43B 13/125; A43B 13/04; A43B 13/186; A43B 13/189; A43B 13/20; A43B 13/223; A43B 13/203; A43B 13/206

USPC .......................................................... 36/28
See application file for complete search history.

(56) References Cited

U.S. PATENT DOCUMENTS

| | | |
|---|---|---|
| 3,795,994 A | 3/1974 | Ava |
| 4,217,705 A | 8/1980 | Donzis |
| 4,229,889 A | 10/1980 | Petrosky |
| 4,446,634 A | 5/1984 | Johnson et al. |

(Continued)

FOREIGN PATENT DOCUMENTS

| | | | | |
|---|---|---|---|---|
| CA | 2941113 C | * | 12/2022 | ........... B29C 64/153 |
| CN | 101370405 A | | 2/2009 | |

(Continued)

OTHER PUBLICATIONS

Jun. 22, 2017—(WO) ISR & WO—App. No. PCT/US17/023513.
Miscellaneous Statement Regarding Information Disclosure Statement Filed Nov. 23, 2021.

*Primary Examiner* — Alissa J Tompkins
*Assistant Examiner* — Catherine M Ferreira
(74) *Attorney, Agent, or Firm* — Banner & Witcoff, Ltd.

(57) ABSTRACT

A method for manufacturing a sole structure. Data is received for a cushioning profile of the sole structure of an article of footwear, the sole structure including a bladder network including multiple bladders interconnected by conduits, the sole structure also including a plurality of openings exposing the conduits. Based on the received data, configurations of at least some stems in a frame are adjusted. The frame is installed into the sole structure, the installing including inserting the stems through the openings so as to at least partially close at least a portion of the conduits.

9 Claims, 28 Drawing Sheets

(56) References Cited

U.S. PATENT DOCUMENTS

| | | | |
|---|---|---|---|
| 5,179,792 A * | 1/1993 | Brantingham | A43B 13/203 |
| | | | 36/71 |
| 5,406,719 A | 4/1995 | Potter | |
| 5,493,792 A | 2/1996 | Bates et al. | |
| 5,673,498 A | 10/1997 | Amir et al. | |
| 5,784,807 A | 7/1998 | Pagel | |
| 5,794,361 A | 8/1998 | Sadler | |
| 5,915,819 A | 6/1999 | Gooding | |
| 5,950,332 A | 9/1999 | Lain | |
| 6,134,812 A | 10/2000 | Voss | |
| 6,178,663 B1 | 1/2001 | Schoesler | |
| 6,282,815 B1 | 9/2001 | Caston | |
| 6,354,020 B1 | 3/2002 | Kimball et al. | |
| 6,370,799 B1 * | 4/2002 | Thatcher | A43B 7/085 |
| | | | 36/3 A |
| 6,457,262 B1 | 10/2002 | Swigart | |
| 6,463,612 B1 | 10/2002 | Potter | |
| 6,505,420 B1 | 1/2003 | Litchfield et al. | |
| 6,519,797 B1 | 2/2003 | Brubaker et al. | |
| 6,722,059 B2 | 4/2004 | Robinson, Jr. et al. | |
| 6,751,892 B2 | 6/2004 | Chavet et al. | |
| 6,754,981 B1 | 6/2004 | Edwards | |
| 6,763,612 B2 | 7/2004 | Stubblefield et al. | |
| 6,892,477 B2 | 5/2005 | Potter et al. | |
| 6,915,594 B2 | 7/2005 | Kim | |
| 7,152,343 B2 | 12/2006 | Whatley | |
| 7,409,779 B2 | 8/2008 | Dojan et al. | |
| 7,409,780 B2 | 8/2008 | Marvin et al. | |
| 7,426,793 B2 * | 9/2008 | Crary | A43B 7/081 |
| | | | 36/114 |
| 7,448,150 B1 | 11/2008 | Davis et al. | |
| 7,451,554 B2 | 11/2008 | Hazenberg et al. | |
| 7,451,556 B2 | 11/2008 | Harmon-Weiss et al. | |
| 7,694,438 B1 | 4/2010 | Christensen et al. | |
| 7,735,241 B2 | 6/2010 | Marvin et al. | |
| 7,793,430 B2 | 9/2010 | Ellis | |
| 7,930,839 B2 | 4/2011 | Litchfield et al. | |
| 7,934,521 B1 | 5/2011 | Busse et al. | |
| 8,015,730 B2 | 9/2011 | Hazenberg | |
| 8,117,766 B2 | 2/2012 | Gornatti | |
| 8,151,489 B2 | 4/2012 | Marvin et al. | |
| 8,234,798 B2 | 8/2012 | DiBenedetto et al. | |
| 8,375,601 B2 | 2/2013 | Corbett | |
| 8,434,244 B2 | 5/2013 | Litchfield et al. | |
| 8,713,817 B2 | 5/2014 | Litchfield et al. | |
| 8,893,403 B2 * | 11/2014 | Mohlmann | A43B 7/06 |
| | | | 36/3 R |
| 9,063,529 B2 | 6/2015 | Ellis | |
| 9,066,558 B2 | 6/2015 | Molyneux et al. | |
| 9,144,267 B2 * | 9/2015 | Lo | A43B 13/203 |
| 2006/0130369 A1 | 6/2006 | Christensen et al. | |
| 2006/0196081 A1 * | 9/2006 | Lee | A43B 13/206 |
| | | | 36/29 |
| 2007/0094890 A1 * | 5/2007 | Cho | A43B 13/203 |
| | | | 36/3 B |
| 2009/0151203 A1 * | 6/2009 | Boyer | A43B 7/082 |
| | | | 36/3 R |
| 2013/0212909 A1 | 8/2013 | Bates et al. | |
| 2014/0223772 A1 | 8/2014 | Marvin et al. | |
| 2014/0283413 A1 | 9/2014 | Christensen et al. | |
| 2015/0257479 A1 * | 9/2015 | Ellis | A43B 3/38 |
| | | | 340/870.07 |

FOREIGN PATENT DOCUMENTS

| | | |
|---|---|---|
| EP | 2460427 A1 | 6/2012 |
| FR | 2915855 A1 | 11/2008 |

* cited by examiner

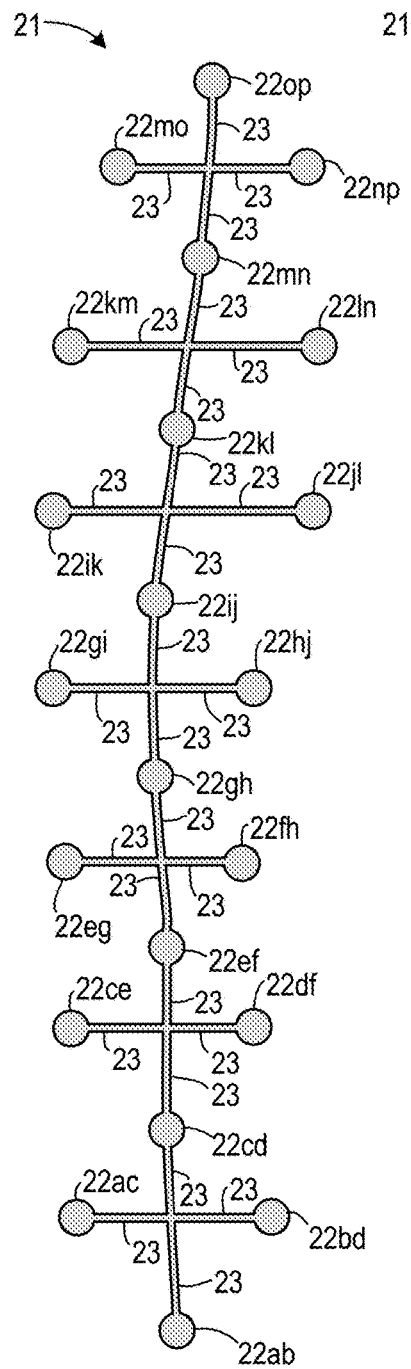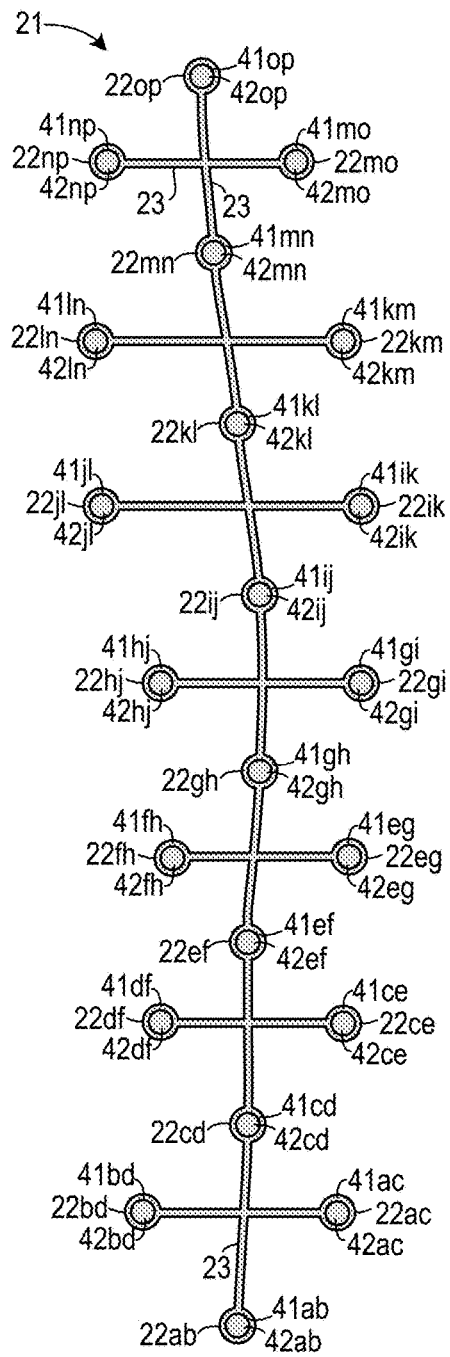
FIG. 12    FIG. 13    FIG. 14

SOLE STRUCTURE WITH CUSTOMIZABLE BLADDER NETWORK

RELATED APPLICATION DATA

This application is a divisional of U.S. patent application Ser. No. 15/134,913 filed Apr. 21, 2016, now allowed, and entitled "Sole Structure With Customizable Bladder Network." Said application is entirely incorporated herein by reference.

BACKGROUND

Conventional articles of footwear generally include an upper and a sole structure. The upper provides a covering for the foot and securely positions the foot relative to the sole structure. The sole structure is secured to a lower portion of the upper and is configured so as to be positioned between the foot and the ground when a wearer is standing, walking, or running. The sole structure may include one or more cushioning elements. Those cushioning elements may help to attenuate and dissipate forces on a wearer foot that may result from ground impact during walking or running.

One type of cushioning element is a bladder. One or more bladders may be embedded or otherwise incorporated into a sole structure. Each bladder may define an interior volume that is filled with air or with another gas. When subjected to downward force from a foot during running or other activity, the bladder may be compressed. This may cause an increase in the pressure of the gas within the bladder, thereby resisting further compression. The resistance to compression can vary based on the initial pressure of the gas, based on the volume and shape of the bladder, based on whether any of the gas is able to escape from the bladder, and on other considerations.

Conventionally, sole structures have been designed based on a particular condition or set of conditions, and/or based on a particular set of preferences and/or characteristics of a targeted shoe wearer. For example, a bladder and/or other cushioning elements may be sized and located based on expected movements of a shoe wearer associated with a particular type of sport. In many cases, a configuration of cushioning elements may be a compromise among numerous possible alternatives. Because of variations among different potential wearers of a particular shoe, however, some individuals may find a particular compromise to be less than satisfactory.

SUMMARY

This Summary is provided to introduce a selection of concepts in a simplified form that are further described below in the Detailed Description. This Summary is not intended to identify key features or essential features of the invention.

In at least some embodiments, a sole structure may include a midsole. The sole structure may further include a bladder network. The bladder network may include first and second bladders interconnected by a conduit. At least a portion of the bladder network may contain a fluid. The bladder network may be at least partially incorporated into the midsole. A first stem may be positioned to impinge upon an external surface of, and at least partially deform, the conduit.

In at least some embodiments, a sole structure may include a midsole and a bladder network. The bladder network may include first and second bladders interconnected by a conduit. At least a portion of the bladder network may contain a fluid. The bladder network may be embedded in and covered on top and bottom sides by the midsole. The midsole may include an opening exposing the conduit.

In at least some embodiments, a method may include receiving data for a cushioning profile of a sole structure of an article of footwear. The sole structure may include a bladder network including multiple bladders interconnected by conduits. The sole structure may further include a plurality of openings exposing the conduits. The method may also include adjusting, based on the received data, configurations of at least some stems in a frame. The method may further include installing the frame into the sole structure by inserting the stems through the openings so as to at least partially close at least a portion of the conduits.

Additional embodiments are described herein.

BRIEF DESCRIPTION OF THE DRAWINGS

Some embodiments are illustrated by way of example, and not by way of limitation, in the figures of the accompanying drawings and in which like reference numerals refer to similar elements.

FIGS. 12 through 14 are respective bottom, lateral side, and top views of the cushioning profile customization frame from the shoe of FIG. 1.

DETAILED DESCRIPTION

Figure 1:
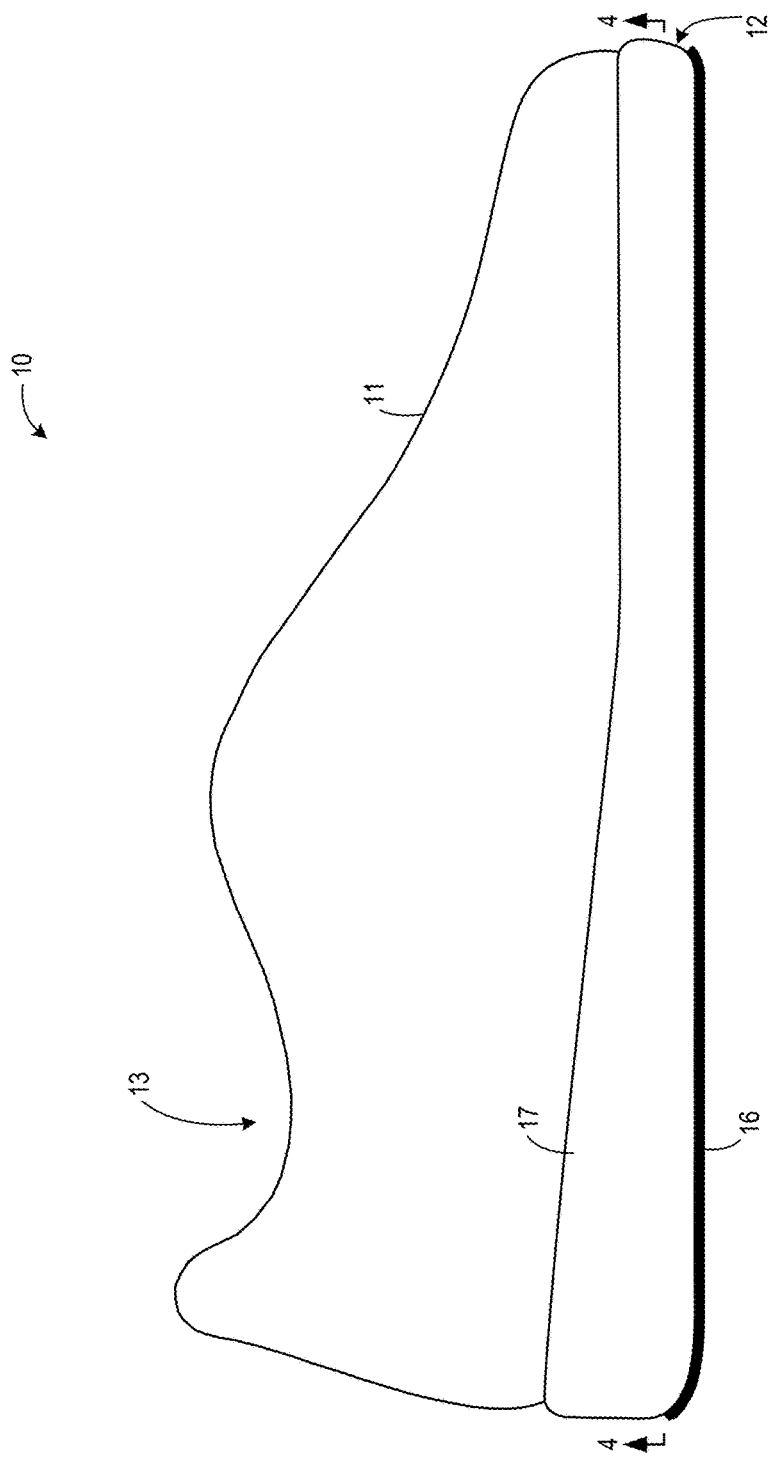
FIG. 1 is a lateral side view of a shoe according to some embodiments.

The manner in which a sole structure provides cushioning to a foot during walking, running, and/or other activities can be called a cushioning profile. Aspects of a cushioning profile may include relative locations of sole structure regions that are more or less firm than other sole structure regions. Cushioning profile aspects may also include how one or more regions dynamically react to changing forces during various activities.

It may be advantageous to customize a sole structure cushioning profile. A person's gait, i.e., the manner in which that person walks or runs, can affect how that person's foot interacts with a shoe during walking or running. The gait of one person may be slightly different from the gait of another person. There may also be variations among different persons with regard to foot shape and/or other characteristics that affect how a particular person's foot may interact with the ground and with a shoe. Even among persons of the same sex and who wear shoes of the same size, there can be significant variations in gait, foot shape, personal preferences, and/or other characteristics that affect how each person will respond to a particular cushioning profile. As a result, a cushioning profile that might be desirable for one person may be less desirable for another person.

The nature of an expected activity may also affect how a person's foot will interact with a shoe, and thus also affect the desirability of a particular cushioning profile. For example, a particular shoe may be usable for a sport played on different types of playing surfaces. A cushioning profile that is desirable for wear during play on a softer surface such as grass may be less desirable for wear during play on a harder surface such as concrete or dirt. As another example, a particular shoe may be usable for sports or other activities that require different types of movement. One sport may largely comprise running in a straight line, while a different sport may include a much higher percentage of side-to-side movements. A cushioning profile that is optimized for running in a straight line may be less optimal for side-to-side movements.

In some embodiments, a sole structure may include a network of bladders that are interconnected by one or more conduits. When at least partially open, each of these conduits may allow fluid to flow from one bladder on one side of the conduit having a higher fluid pressure to another bladder on the other side of that conduit and having a lower fluid pressure. Higher fluid pressure in one bladder may result from, e.g., the weight of a wearer during a portion of a step cycle. Different conduits may be closed, partially or completely, to restrict flow between bladders. This allows customization of the sole structure cushioning profile. The degree of flow restriction in a conduit controls if, or how fast, fluid flows between bladders connected by that conduit, thereby increasing or decreasing sole structure firmness in response to downward force from a wearer's foot. If fluid flow from a bladder is completely or substantially restricted, for example, a region of the sole structure in which that bladder is located may feel relatively firm to the wearer. Conversely, a region of a sole structure may feel less firm if flow from that bladder is less restricted and/or if multiple flow paths from that bladder are open.

In some embodiments, fluid flow in conduits is controlled by one or more stems that are installed in the sole structure. At least some of those stems may be positioned to impinge on conduits. In some embodiments, a stem may be positioned so as to impinge upon a conduit at all times. For example, a stem may be positioned to impinge upon a conduit regardless of fluid pressure within the conduit or in bladders connected to that conduit. In some embodiments, a stem may be positioned so as to impinge upon a conduit at certain times, but to not necessarily impinge upon the conduit at all times. For example, a conduit may have walls that expand outward if fluid pressure within the conduit rises. A stem may be positioned over such a conduit so that it prevents the conduit from completely expanding if fluid pressure within the conduit rises.

In some embodiments, stems may have lengths and/or shapes that are configured to control whether, and the degree to which, each of those stems impinges on a corresponding conduit. Some stems may not impinge upon a conduit at all and may be used to fill a conduit access opening. Stems for a particular sole structure may be parts of a cushioning profile customization frame.

Additional embodiments are described below.

To assist and clarify subsequent description of various embodiments, various terms are defined herein. Unless context indicates otherwise, the following definitions apply throughout this specification (including the claims). "Shoe" and "article of footwear" are used interchangeably to refer to an article intended for wear on a human foot. A shoe may or may not enclose the entire foot of a wearer. For example, a shoe could include a sandal-like upper that exposes large portions of a wearing foot.

Shoe elements can be described based on regions and/or anatomical structures of a human foot wearing that shoe, and by assuming that the interior of the shoe generally conforms to and is otherwise properly sized for the wearing foot. A forefoot region of a foot includes the heads and bodies of the metatarsals, as well as the phalanges. A forefoot element of a shoe is an element having one or more portions located under, over, to the lateral and/or medial side of, and/or in front of a wearer's forefoot (or portion thereof) when the shoe is worn. A midfoot region of a foot includes the cuboid, navicular, and cuneiforms, as well as the bases of the metatarsals. A midfoot element of a shoe is an element having one or more portions located under, over, and/or to the lateral and/or medial side of a wearer's midfoot (or portion thereof) when the shoe is worn. A heel region of a foot includes the talus and the calcaneus. A heel element of a shoe is an element having one or more portions located under, to the lateral and/or medial side of, and/or behind a wearer's heel (or portion thereof) when the shoe is worn. The forefoot region may overlap with the midfoot region, as may the midfoot and heel regions.

Unless indicated otherwise, a longitudinal axis refers to a horizontal heel-toe axis along the center of the foot that is roughly parallel to a line along the second metatarsal and second phalanges. A transverse axis refers to a horizontal axis across the foot that is generally perpendicular to a longitudinal axis. A longitudinal direction, orientation, etc. is generally parallel to a longitudinal axis. A transverse direction, orientation, etc. is generally parallel to a transverse axis. In the context of a sole structure or component thereof, upward and downward directions generally assume that the ground-contacting surface of the sole structure is resting on a horizontal surface.

FIG. 1 is a lateral side view of a shoe 10 according to some embodiments. The medial side of shoe 10 has a similar configuration and appearance, but is configured to correspond to a medial side of a wearer foot. Shoe 10 is configured for wear on a right foot and is part of a pair that includes a shoe (not shown) that is a mirror image of shoe 10 and is configured for wear on a left foot.

Shoe 10 includes an upper 11 attached to a sole structure 12. Upper 11 may be a conventional upper formed from any of various types or materials and have any of a variety of different constructions. Upper 11 includes an ankle opening 13 through which a wearer foot may be inserted into an interior void defined by the upper. Laces, straps, and/or other types of tightening elements may be included to cinch upper 11 about a wearer foot. To avoid obscuring the drawing with unnecessary detail, tightening elements and other features of upper 11 are omitted from FIG. 1. Upper 11 may be lasted with a strobel or in some other manner and bonded to sole structure 12 in a conventional manner.

Sole structure 12 may include an outsole 16 attached to a midsole 17. Outsole 16 may be formed from natural and/or synthetic rubber, and/or other elastomer(s) and/or other conventional outsole materials. Midsole 17 may include one or more pieces of compressed EVA (ethylene vinyl acetate) and/or other type of polymer foam. As explained in more detail below, a bladder network may be incorporated into midsole 17.

Figure 2:
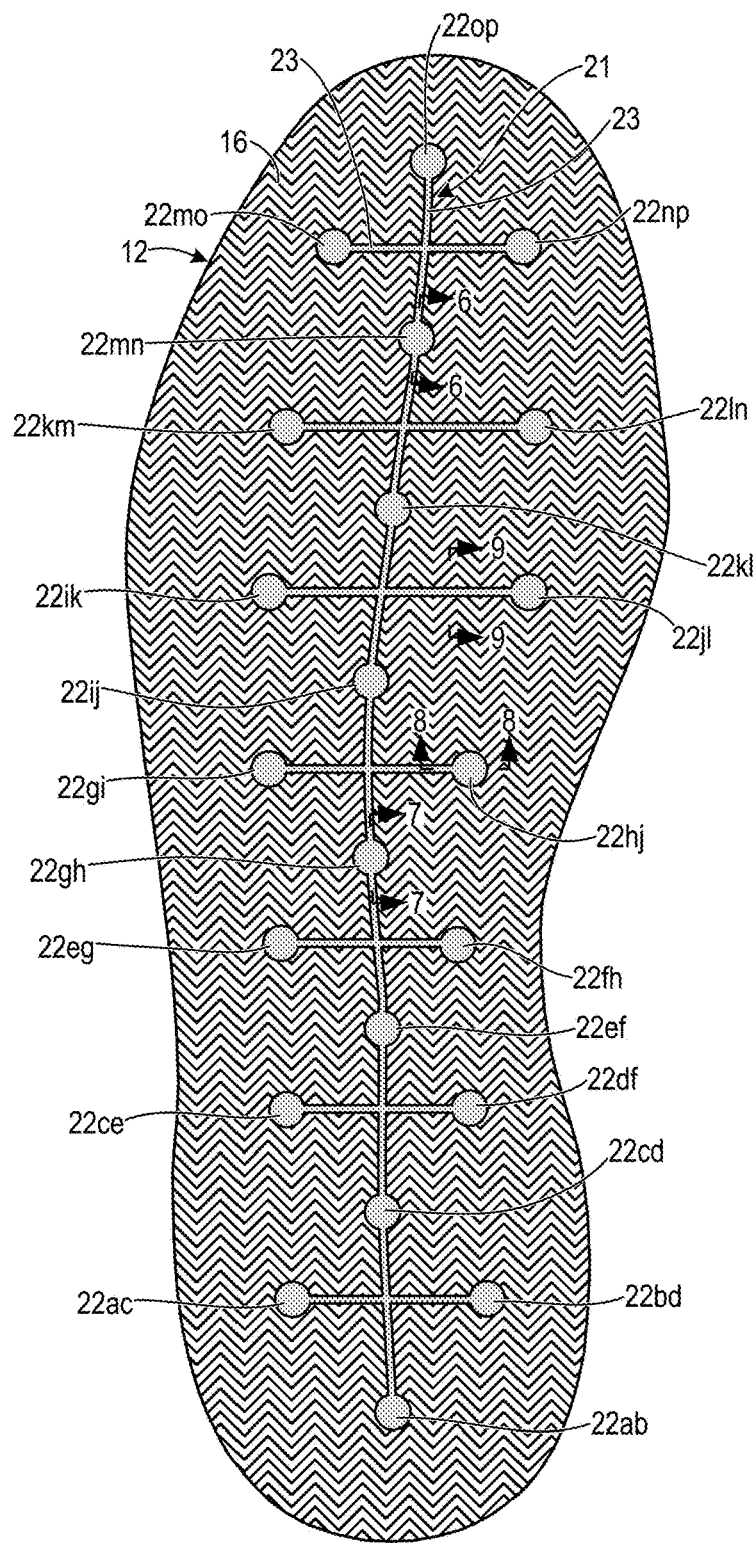
FIG. 2 is a bottom view of the shoe of FIG. 1.

FIG. 2 is a bottom view of shoe 10 and shows additional details of outsole 16. The exposed surface of outsole 16 intended for ground contact includes a tread pattern to enhance traction. In the embodiment of shoe 10, a simple herringbone tread pattern is shown for convenience. In other embodiments, other tread patterns and/or other types of surface features may be included. For example, a bottom surface of an outsole may include lugs or other types of traction elements formed therein. In some embodiments, a sole structure may lack a separate outsole and a bottom surface of a midsole could be positioned for ground contact, or an outsole may only cover a portion of a sole structure bottom side.

Also visible in FIG. 2 is a bottom side of a cushioning profile customization frame 21. Customization frame 21 includes a plurality of stems 22ab through 22op. Stems 22ab through 22op will be referenced collectively and/or generically using the same reference number 22, but without appended lower case letters used to identify specific stems 22. A similar convention will be used with regard to other components that are individually differentiated by reference numbers with appended lower case letters. Stems 22 are joined by connecting branches 23. As explained in more detail below, stems 22 extend upward on a top side of customization frame 21. Stems 22 are configured so that some stems 22 completely close some bladder network conduits, some stems 22 partially close other conduits, and some stems 22 leave other conduits completely open. In some embodiments, customization frame 21 may be formed from the same material used to create outsole 16 (e.g., synthetic rubber). In other embodiments, customization frame 21 may be formed from other materials. Examples of other materials from which a customization frame may be formed include, without limitation, thermoplastic polyurethane (TPU), polyurethane (PU), acrylonitrile butadiene styrene (ABS), polylactic acid (PLA), polyamide (Nylon), glass filled polyamide, and epoxy resins. In some embodiments, a customization frame may be formed from multiple different materials.

Figure 3:
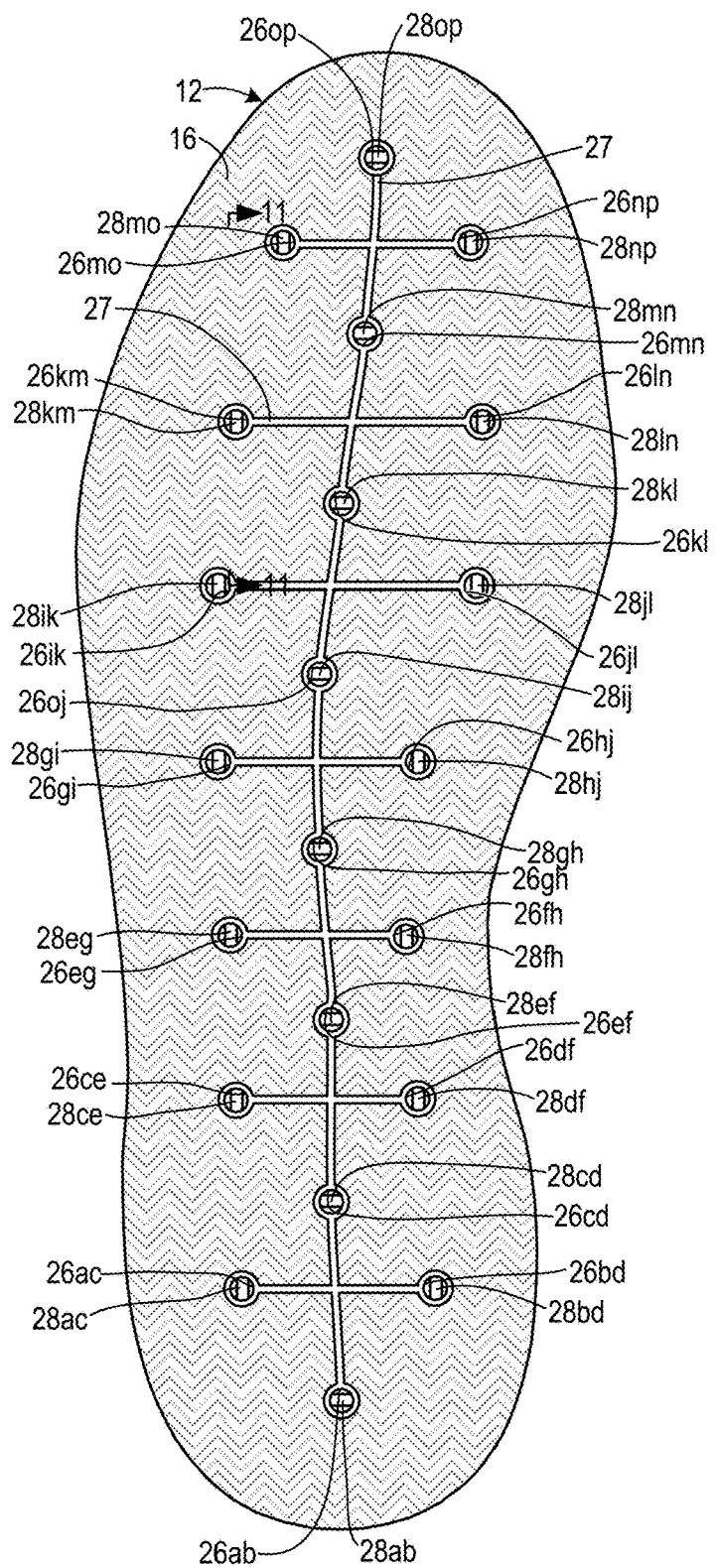
FIG. 3 is a bottom view of the shoe of FIG. 1, and with a cushioning profile customization frame omitted.

FIG. 3 is another bottom view of shoe 10, but with customization frame 21 omitted to expose openings 26ab through 26op, channels 27ab through 27op, and conduits 28ab through 28op. To avoid obscuring openings 26, channels 27, conduits 28, and lead lines connecting those features with identifying reference numbers, the tread pattern of outsole 16 is shown in FIG. 3 using lighter lines than are used in FIG. 2. Openings 26 are formed in outsole 16 and in regions of midsole 17 located below conduits 28. As explained in more detail below, conduits 28 interconnect bladders of a bladder network embedded in midsole 17. Each of openings 26 is sized to receive an upwardly extending portion of a stem 22. Channels 27 extend between openings 26 and receive branches 23 of frame 21.

In some embodiments, and as discussed below, customization frame 21 is permanently installed in sole structure 12 using adhesive, thermal bonding, or other technique. Once permanently installed, frame 21 cannot be removed without at least partially damaging frame 21 and/or outsole 16 and/or midsole 17. In other embodiments, frame 21 may be non-permanently installed and may be removable without damaging outsole 16, midsole 17, or frame 21. In some such embodiments, a removed frame 21 may then be replaced with a different frame to adjust a cushioning profile of sole structure 12.

Figure 4:
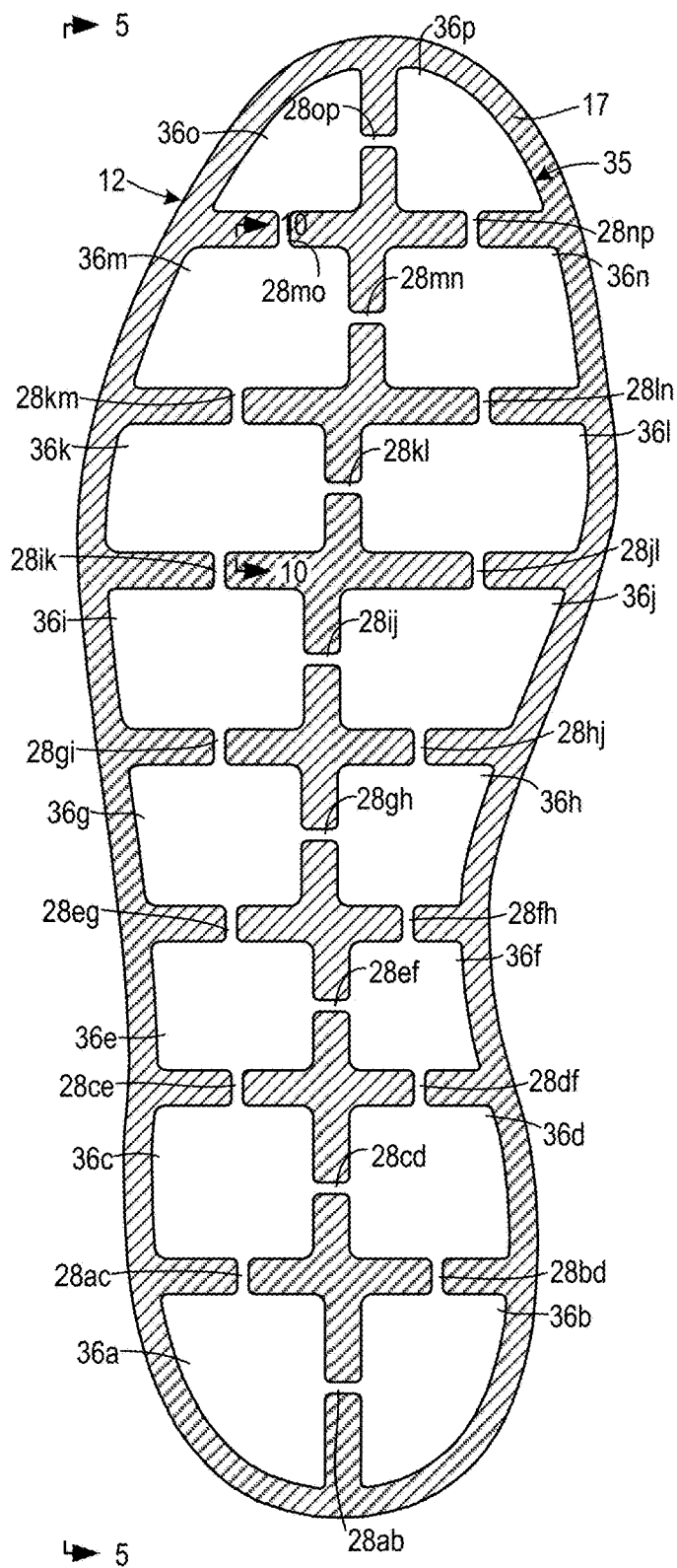
FIG. 4 is a partially schematic bottom view of the shoe of FIG. 1, and with a portion of a sole structure omitted to expose a bladder network.
Figure 5:
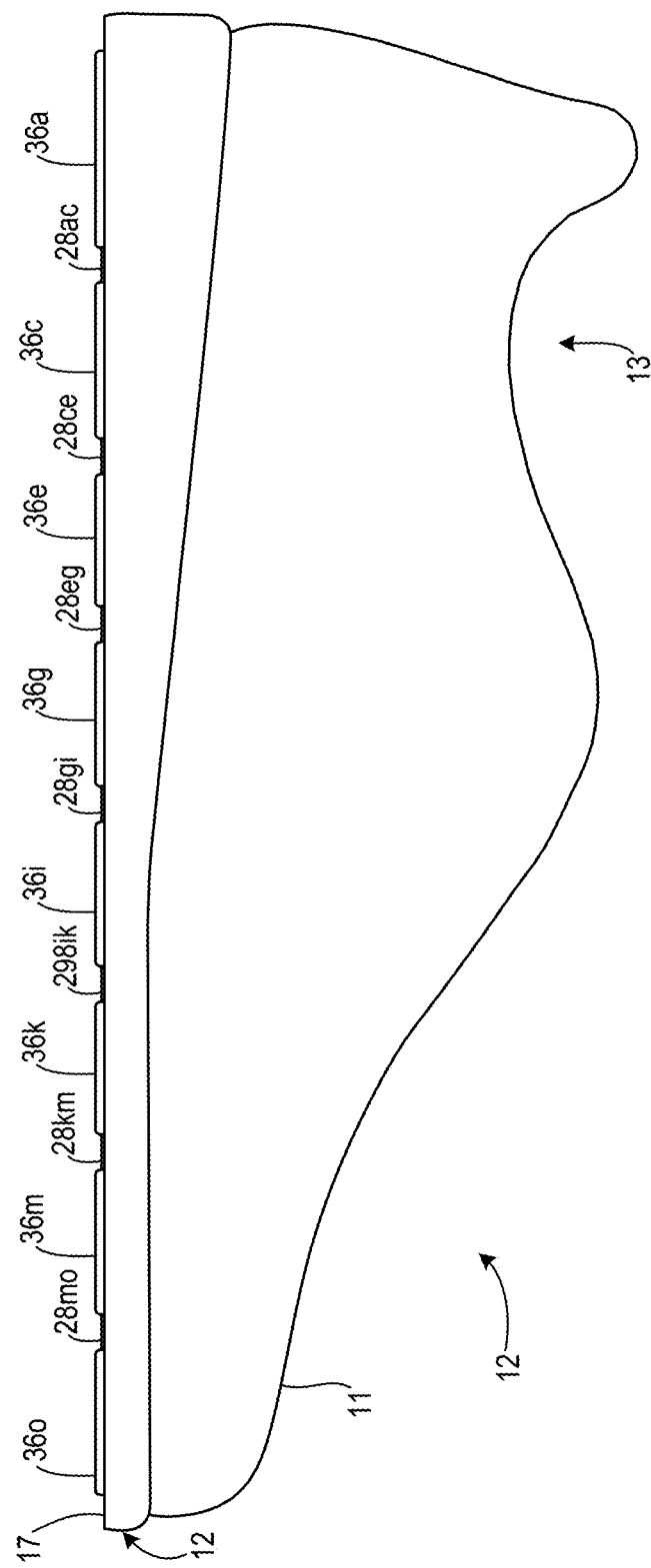
FIG. 5 is a side view from the location indicated in FIG. 4.

FIG. 4 is another bottom view of shoe 10, but in which outsole 16, customization frame 21, and a bottom portion of midsole 17 have been omitted to expose a bladder network 35. In particular, outsole 16 and the portion of midsole 17 below the plane indicated by arrows 4 in FIG. 1 are omitted in FIG. 4. As to midsole 17, FIG. 4 is similar to a partially schematic cross-sectional view from the plane indicated by arrows 4 in FIG. 1. As to bladder network 35, which is not shown in cross-section, FIG. 4 is similar to a simple bottom view. The layout of elements shown in FIG. 4 is further illustrated in FIG. 5, a side view of shoe 10, as modified in FIG. 4, from the location indicated in FIG. 4.

Bladder network 35 includes multiple bladders 36a-36p interconnected by conduits 28. In the embodiment of shoe 10, bladder network 35 includes lateral heel region bladders 36a and 36c, medial heel region bladders 36b and 36d, lateral midfoot region bladders 36e, 36g, and 36i, medial midfoot region bladders 36f, 36h, and 36j, lateral forefoot region bladders 36k and 36m, medial forefoot region bladders 36l and 36n, lateral toe region bladder 36o, and medial toe region bladder 36p. Each of bladders 36 is connected to transversely adjacent and longitudinally adjacent bladders by conduits 28. In particular, and as shown in FIG. 4, bladders 35a and 35b are connected by conduit 28ab, bladders 35a and 35c are connected by conduit 28ac, bladders 35b and 35d are connected by conduit 28bd, etc.

Except for portions of conduits 28 exposed by openings 26 (FIG. 3), bladder network 35 is completely surrounded by the foam material of midsole 17. This is explained in more detail below in connection with FIG. 11.

Each bladder 36 defines an inner chamber that is in fluid communication with the inner passages of conduits 28 connected to that bladder. The inner volume of bladder network 35, which includes the inner chambers of bladders 36 and the inner passages of conduits 28, may be filled or partially filled with a fluid. As used herein, "fluid" is used generically and can be a gas, a liquid, or a mixture of one or more gases and/or one or more liquids. In some embodiments, the fluid used in bladder network 36 is air. In other embodiments, one or more other gases and/or liquids may be used instead of, or in addition to, air. Examples of other gases that may be used include, without limitation, nitrogen, helium, and "super gasses" such as, e.g., octafluoropropane, hexafluoroethane, or sulfur hexafluoride. Examples of liquids that may be used in bladder network 35 include, without limitation, water.

A conduit 28 can be deformed by a stem impinging on an outer conduit surface, as described in more detail below. Such deformation may alter or constrain the cross-sectional shape of the conduit internal passage, thereby affecting the rate at which fluid can flow through that passage from one bladder 36 to another bladder 36. Depending on the degree of impingement, flow through the conduit may be completely blocked or only partially blocked. If completely blocked, no fluid can flow (i.e., a fluid flow rate of zero). If partially blocked, fluid can flow at a rate that is greater than zero but less than a maximum flow rate possible when there is no impingement.

Figure 6:
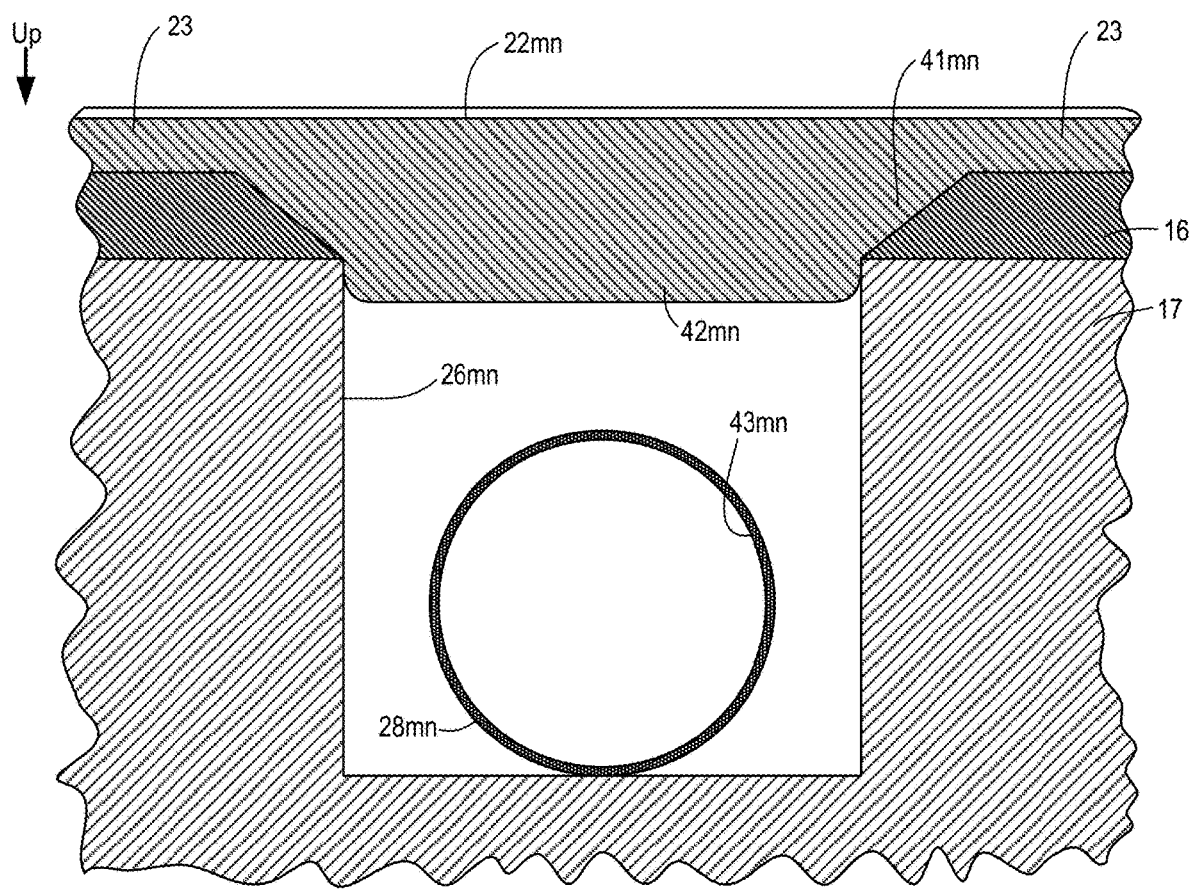
FIGS. 6 through 9 are partially schematic area cross-sectional views along the sectioning planes indicated in FIG. 2.

FIG. 6 is a partially schematic area cross-sectional view along the sectioning plane indicated in FIG. 2 by arrows 6. Stem 22*mn* and its corresponding conduit 28*mn* are visible in FIG. 6. In the embodiment of shoe 10, conduits 28 are configured to be open unless deformed by an external force applied by an impinging stem 22. This configuration can be achieved in any of various ways. In the embodiment of shoe 10, bladder network 35, including conduits 28, is formed from a resilient polymeric material. Examples of such materials include conventional materials from which footwear bladders have been manufactured including, without limitation, TPU, PU, polyester, polyester polyurethane, and polyether polyurethane. A combination of materials (e.g., alternating layers of thermoplastic polyurethane and ethylene-vinyl alcohol copolymer) may be used so as to create a multi-layer wall structure of bladder network 35.

As seen in FIG. 6, stem 22*mn* includes a base 41*mn* and an upward projection 42*mn*. Because of the orientation of FIG. 6, the upward direction is toward the bottom of the page as indicated. Indications of the upward direction are also included in other cross-sectional view of sole structures according to various embodiments. Upward projection 42*mn* is relatively short and does not reach conduit 28*mn*. Because conduit 28*mn* is not impinged upon or deformed by stem 22*mn*, the rate of fluid flow between the internal chamber of bladder 36*m* and the internal chamber of bladder 36*n*, through internal passage 43*mn* of conduit 28*mn*, is not affected by stem 28*mn*. Instead, stem 22 merely serves to close opening 26*mn*.

As used herein, "fluid flow between" an arbitrary chamber X and an arbitrary chamber Y does not imply a direction of flow. In particular, a reference to fluid flow between chamber X and chamber Y could mean flow from chamber X to chamber Y or from chamber Y to chamber X. In general, direction of flow between chamber X and chamber Y is determined based on pressure differential of chambers X and Y. If fluid pressure in chamber X is greater than fluid pressure in chamber Y, fluid will flow from chamber X to chamber Y if there is a conduit internal passage or other flow path connecting chambers X and Y. If fluid pressure in chamber Y is greater than fluid pressure in chamber X, the flow will instead be from chamber Y to chamber X (assuming an available flow path). The rate of fluid flow rate will be affected by the magnitude of the pressure differential and by the size and shape of the available flow path(s).

Figure 7:
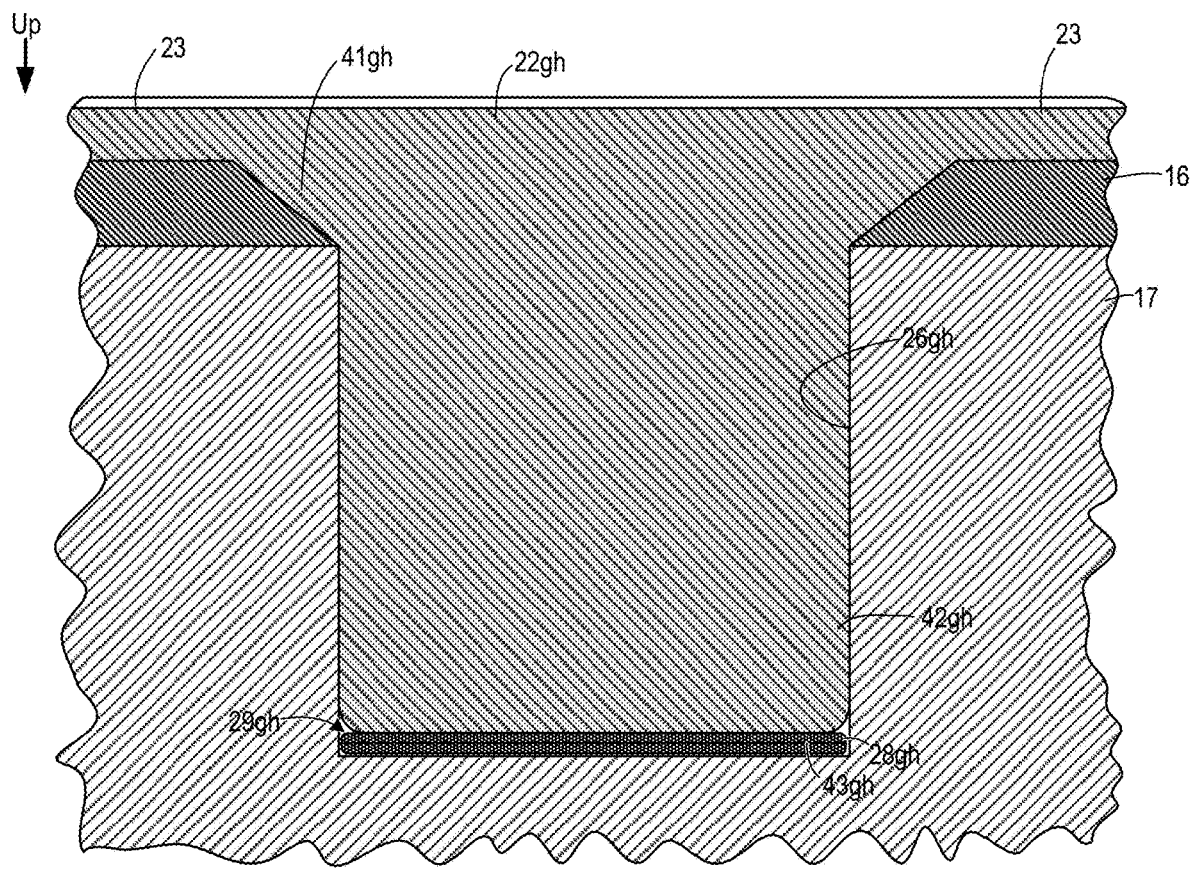

FIG. 7 is a partially schematic area cross-sectional view along the sectioning plane indicated in FIG. 2 by arrows 7. Stem 22*gh* and its corresponding conduit 28*gh* are visible in FIG. 7. Upward projection 42*gh* has a length and an end shape that are configured to completely close conduit 28*gh*. The upper end of projection 42*gh* contacts an outer surface 29*gh* of conduit 28*gh* and impinges upon and deforms conduit 28*gh*. In the case of conduit 28*gh*, that deformation completely closes internal passage 43*gh* of conduit 28*gh*. As a result, fluid cannot flow between the inner chamber of bladder 36*g* and the inner chamber of bladder 36*h* through conduit 28*gh*.

FIGS. 6 and 7 show openings 26*mn* and 26*gh* as having equivalent depths. Other cross-sectional views of sole structure 12 and of sole structures according to other embodiments also show openings having similar depths. In some embodiments, however, depths of openings may vary based on position in a sole structure. For example, openings in a heel region may be deeper than openings in a forefoot region. In some such embodiments, a heel region stem configured to completely close a corresponding heel region conduit may be longer than a forefoot region stem configured to close a corresponding forefoot region conduit.

Figure 8:
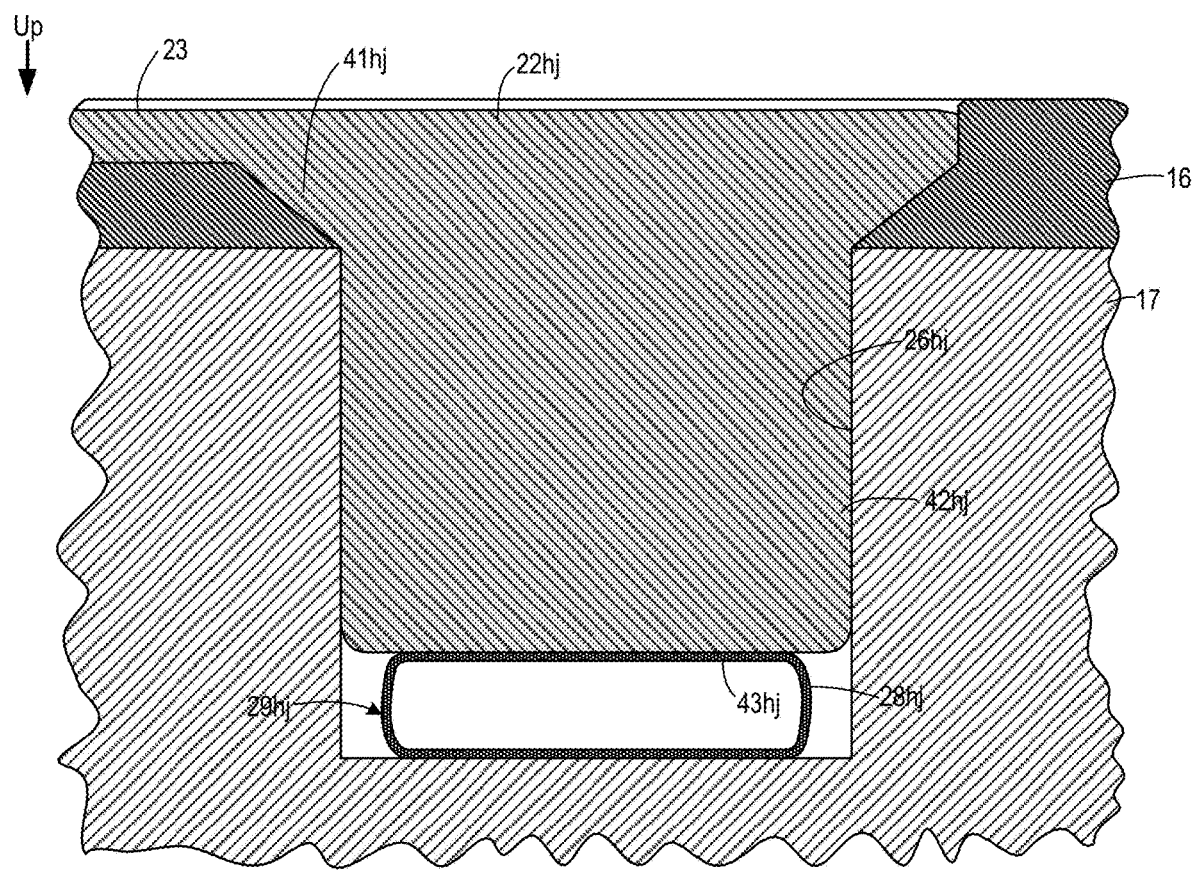

FIG. 8 is a partially schematic area cross-sectional view along the sectioning plane indicated in FIG. 2 by arrows 8. Stem 22*hj* and its corresponding conduit 28*hj* are visible in FIG. 8. Upward projection 42*hj* has a length and an end shape configured to partially close conduit 28*hj*. The upper end of projection 42*hj* contacts the outer surface 29*hj* of conduit 28*hj*. Although projection 42*hj* impinges upon and deforms conduit 28*hj*, conduit 28*hj* is not completely closed. Instead, the deformation resulting from the impingement by projection 42*hj* changes the shape of internal passage 43*hj* from its undeformed circular shape to a much narrower flattened shape. This deformation effects a partial closing of internal passage 43*hj*. Because the shape change reduces the flow area in passage 43*hj*, the rate at which fluid can flow between bladder 36*h* and bladder 36*j* is reduced relative to what that flow rate would be if conduit 28*hj* were not deformed.

Each of the other stems 22 of customization frame 21 has an upward projection with a length and end shape chosen based on the desired affect on flow rate through the conduit 28 corresponding to that stem. One or more of those other stems 22 may have an upward projection with a configuration similar to that of upward projection 42*mn* (FIG. 6) and may not impinge upon or deform the corresponding conduit 28. One or more of those other stems 22 may have an upward projection with a configuration similar to that of upward projection 42*gh* (FIG. 7) and may impinge upon and deform the corresponding conduits 28 so as to completely close those conduits. One or more of those other stems 22 may have an upward projection with a configuration similar to that of upward projection 42*hj* (FIG. 8) and may impinge upon and deform the corresponding conduits 28 so as to partially close those conduits. The degree of partial closing may be the same as, greater than, or less than that shown in FIG. 8.

A customization frame 21 can be configured in any of various ways. For example, a customization frame 21 could be configured so that all stems 22 have upward projections that, similar to upward projection 42*gh* (FIG. 7), completely close corresponding conduits 28. As another example, a customization frame 21 could be configured so that all stems 22 have upward projections that, similar to upward projection 42*mn* (FIG. 6), leave corresponding conduits 28 fully open. As but another example, a customization frame 21 could be configured so that all stems 22 have upward projections that, similar to upward projection 42*hj* (FIG. 8), partially close corresponding conduits 28. The degree of partial closure may, but need not, be the same for every conduit in such a configuration. All other configurations are also within the scope of this disclosure, including, without limitation, (i) one conduit fully closed, one conduit partially closed, all other conduits partially closed, (ii) one or more conduits fully closed, one or more conduits fully open, no conduits partially closed, (iii) one or more conduits fully closed, one or more conduits partially closed, no conduits fully open, and (iv) one or more conduits fully open, one or more conduits partially closed, no conduits fully closed.

Figure 9:
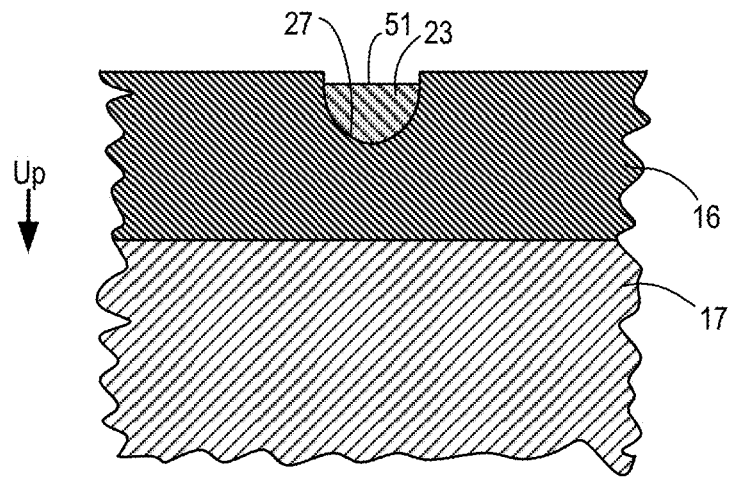

FIG. 9 is a partially schematic area cross-sectional view along the sectioning plane indicated in FIG. 2 by arrows 9. Branches 23 of customization frame 21 rest within channels 27 and have a shapes corresponding to the shapes of channels 27. As shown in FIG. 9, and as is also visible in FIGS. 6 through 8, the bottom surface 51 of customization frame 21 may be recessed within outsole 16. In particular, portions of outsole 16 adjacent to edges of customization frame 21 may extend down farther than bottom surface 51. This configuration may be useful, e.g., prevent damage to customization frame 21 and/or to minimize effects of customization frame 21 on traction provided by outsole 16. In other embodiments, however, a customization frame may extend downward beyond an outsole.

Figure 10:
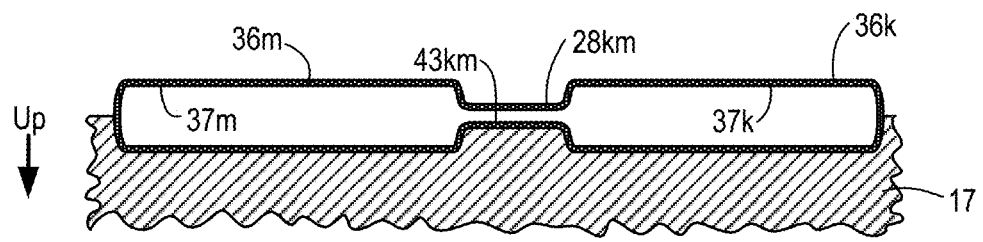
FIG. 10 is a partially schematic area cross-sectional view along the sectioning plane indicated in FIG. 4.
Figure 11:
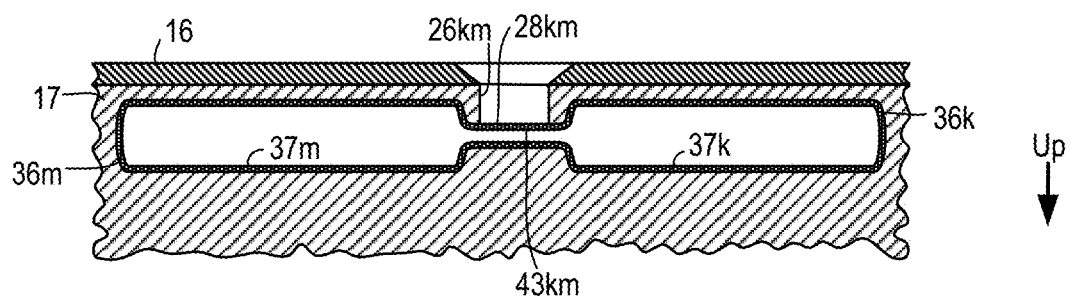
FIG. 11 is a partially schematic area cross-sectional view along the sectioning plane indicated in FIG. 3.

FIG. 10 is a partially schematic area cross-sectional view along the sectioning plane indicated in FIG. 4 by arrows 10. FIG. 11 is a partially schematic area cross-sectional view along the sectioning plane indicated in FIG. 3 by arrows 11. The sectioning planes used to generate FIGS. 10 and 11 are in the same location on sole structure 12. As previously indicated, FIG. 4 omits outsole 16 and a lower portion of midsole 17. Thus, outsole 16 and the lower portion of midsole 17 are also absent from FIG. 10. In FIG. 11, outsole 16 and the lower portion of midsole 17 are included. As seen in FIG. 11, bladders 36$m$ and 36$k$ are completely surrounded by and embedded into midsole 17. Except for the portion of conduit 28$km$ exposed by opening 26$km$, all of conduit 28$km$ is similarly surrounded by and embedded into midsole 17. In the example of FIGS. 10 and 11, it is assumed that customization frame 21 has been removed from (or not yet installed in) sole structure 12, and stem 22$km$ is thus absent. In FIGS. 10 and 11, internal chamber 37$m$ of bladder 36$m$ is in fluid communication with internal chamber 37$k$ of bladder 36$k$ via internal passage 43$km$ of conduit 28$km$. When customization frame 21 is installed in sole structure 12, and depending on the length of stem 22$km$, conduit 28$km$ may remain fully open, may be partially closed, or may be fully closed.

The structure shown in FIG. 11 is typical of other portions of bladder network 35. For example, and except for portions of conduits 28 exposed by openings 26, all bladders 36 and all conduits 28 are surrounded by and embedded into midsole 17.

FIG. 12 is a bottom view of customization frame 21. FIG. 13 is a lateral side view of customization frame 21. FIG. 14 is a top view of customization frame 21. As seen in FIG. 13, stems 22 include upward projections 42 of varying lengths. For simplicity, the example customization frame 21 shown in FIGS. 12 through 14 is shown as having a configuration in which stems 22$mo$ and 22$np$ have the same length, stems 22$km$ and 22$ln$ have the same length, stems 22$ik$ and 22$jl$ have the same length, stems 22$gi$ and 22$hj$ have the same length, stems 22$ce$ and 22$df$ have the same length, and stems 22$ac$ and 22$bd$ have the same length. The example further assumes that stem 22$fh$ has a projection 42$fh$ that is longer than projection 42$eg$ of stem 22$eg$. In other embodiments, however, there may be different combinations of stem configurations.

The customization frame 21 shown in FIGS. 12 through 14 is merely an example of a customization frame according to some embodiments. As indicated above, the lengths and/or end shapes of upward projections 42 can be chosen in a particular embodiment so as to selectively fully close, partially close, or leave open conduits 28. This, in turn, allows customization of the cushioning profile of sole structure 12 based on, e.g., information regarding how a user foot will interact with a shoe during a particular activity. As one example, a first individual may have a running gait in which he strikes the ground with his heel such that his heel must absorb a high percentage of initial impact. Moreover, that first individual may exhibit less-than-average pronation as he transitions from his heel to his toes during a step cycle, thereby placing more than a normal percentage of his weight on the lateral side of the shoe. For this first individual, a frame 21 may be created that partially closes conduits 28$ac$, 28$bd$, 28$ce$, and 28$df$ to slow flow of fluid from heel region bladders 36$a$ through 36$d$, and that closes (completely or almost completely) most or all of transversely oriented conduits 28$ab$, 28$cd$, 28$ef$, 28$gh$, 28$ij$, 28$jl$, 28$mn$, and 28$op$ to increase lateral side firmness. As but another example, a second individual may also have a running gait in which she strikes the ground with her heel, but such that her heel absorbs a much lower percentage of initial impact. This second individual may exhibit a more-than-average amount of pronation. For this second individual, a frame 21 may be created that partially closes conduits 28$ac$, 28$bd$, 28$ce$, and 28$df$ to slow flow of fluid from heel region bladders 36$a$ through 36$d$, but to a lesser degree than with the first individual. The frame 21 for the second individual may also close (completely or almost completely) some or all of the transversely oriented conduits in the forefoot region, but may leave transversely oriented conduits in the rear midfoot and heel regions open.

The above examples are only two of many possible individual characteristics and corresponding customization frame configurations that may be created based on such characteristics. Numerous other customization frame configurations can be created based on the above-described sets of characteristics and/or based on other characteristics, sets of characteristics, and/or objectives. In some embodiments, for example, a user may select a particular cushioning profile based partly or solely on user preference, and/or independently of that user's gait. In some embodiments, a customization frame may be selected to obtain a cushioning profile that encourages a particular gait. As but one example, a user or other person (e.g., a coach) may wish to change pronation. In such a case, a customization frame may be based on a profile that selectively creates firm and soft regions to direct a foot through foot strike. A firm medial side and soft lateral side could fight pronation, while a soft medial side and a form lateral side could fight supination. As another example, a customization frame may be configured so as to modify heel-toe offset. A firmer heel and softer forefoot could allow a forefoot to compress a sole structure more in the forefoot region, creating a higher heel offset feel. A softer heel and a firmer forefoot could have the opposite effect and create a lower heel offset feel.

In some embodiments, customization frames may be created in several predefined configurations. Each configuration could then be marked (e.g., stamped or engraved, printed, etc.) with indicia identifying the configuration and/or the characteristics or set of characteristics the configuration is designed to address. When purchasing a pair of shoes such as shoe 10, an individual could then select the appropriate customization frame.

In some embodiments, after receiving information regarding a foot pressure profile and/or other characteristics of a particular individual and determining the conduits 28 that should be fully or partially closed, a customization frame 21 may be created with stem upward projections 42 that are configured to close the determined conduits. In some embodiments, a customization frame may be fabricated using one or more rapid prototyping manufacturing techniques. Examples of such techniques include, without limitation, 3D printing and laser sintering.

Figures 15, 16:
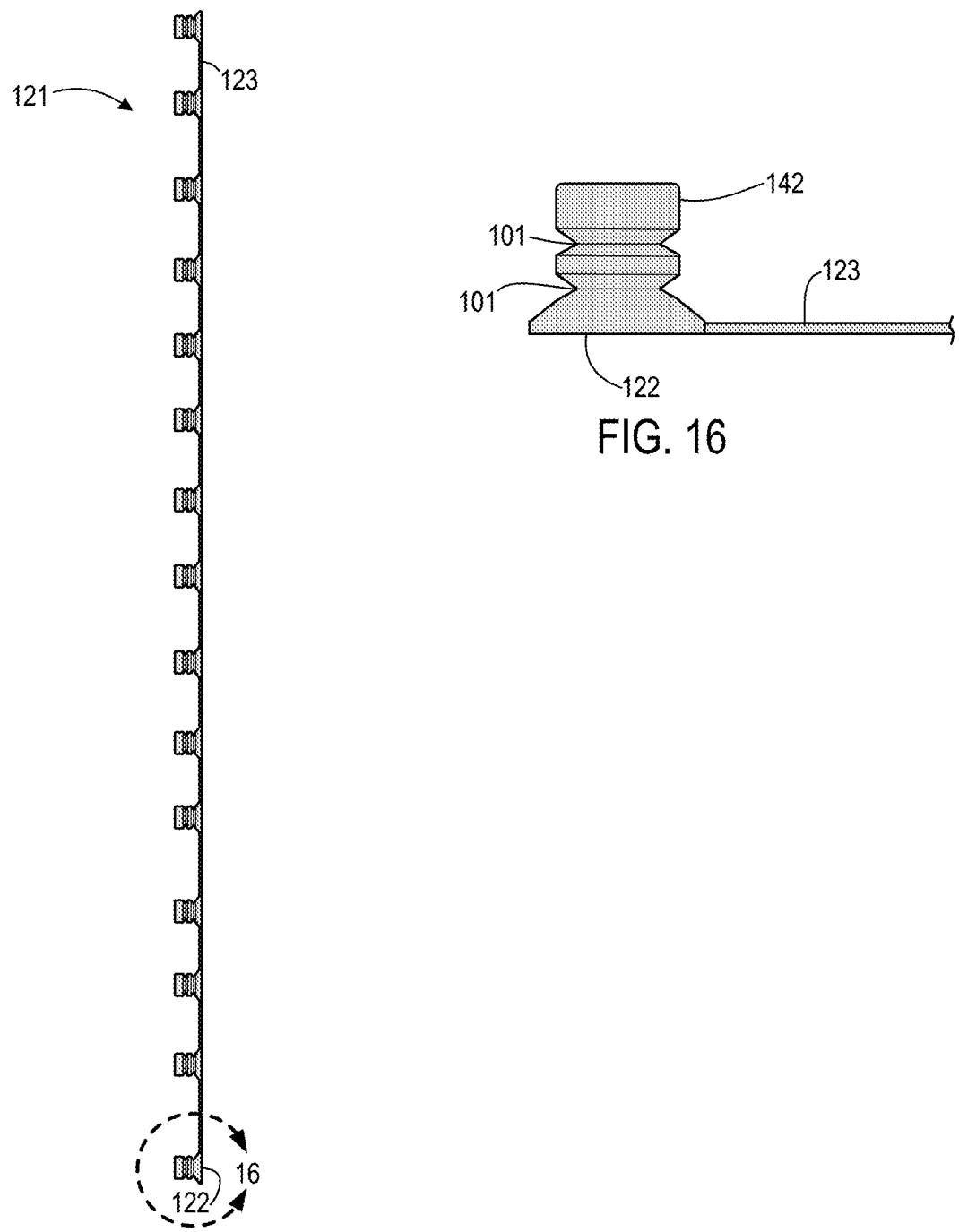
FIG. 15 is a lateral side view of a cushioning profile customization frame according to another embodiment.
FIG. 16 is an enlarged side view of the stem indicated in FIG. 15.

In some embodiments, a frame could be manufactured in a standardized form. Each of the stems of that standardized frame could be formed to facilitate trimming to one of a predefined number of lengths. After receiving information regarding a foot pressure profile and/or other characteristics of a particular individual and determining the conduits 28 that should be fully or partially closed, a standardized frame can be converted to a customized frame by trimming some or all of the stems to appropriate length(s). FIG. 15 is a side view of a frame 121 according to one such embodiment. Except as described herein, frame 121 may be similar to frame 21, and may have stems 122 and branches 123 arranged similar to stems 22 and branches 23 of frame 21. Frame 121 may be used in a shoe similar to shoe 10 in a manner similar to frame 21.

FIG. 16 is an enlarged view of one of stems 122. Other stems 122 have a similar structure. As seen in FIG. 16, the upward projection 142 of stem 122 has a number of grooves 101 defined therein. Each of grooves 101 indicates where projection 122 may be trimmed (e.g., with a knife) to achieve of predefined level of corresponding conduit closure.

In some embodiments, and as indicated above, a customization frame may be permanently installed into sole structure 12. In some such embodiments, and after selecting, fabricating, or trimming a customization frame, that frame may be glued into place. In other embodiments, a customization frame may be permanently installed using other methods. For example a frame could be placed into position in a sole structure, and radio frequency (RF) welding used to fuse portions of the frame to portions of an outsole or other sole structure component.

In some embodiments, and as also indicated above, a customization frame may be non-destructively removable from a sole structure. After removal, another customization frame having a different configuration may be installed into that sole structure. In this manner, the cushioning profile of the sole structure can be adapted by a user for specific activities, based on changes in the user's running gait, and/or for other reasons. For example, a user may have one set of customization frames (one for a right shoe and one for a left shoe) configured to create cushioning profiles adapted to running on softer surfaces such as grass and a second set of customization frames configured to create cushioning profiles adapted to running on harder surfaces such as concrete or asphalt.

Figure 17:
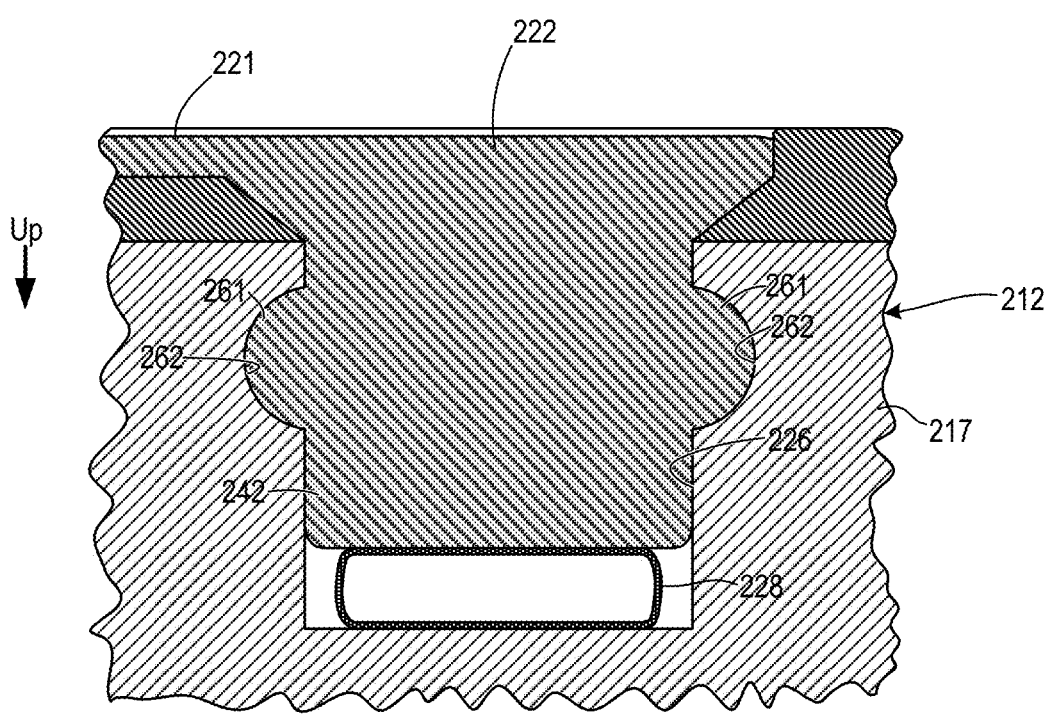
FIG. 17 is a partially schematic area cross-sectional view of an installed stem according to some further embodiments.

FIG. 17 is a partially schematic area cross sectional view of a stem 222 of a customization frame 221 according to some such embodiments. Frame 221 is shown installed in an opening 226 on the underside of a sole structure 212. The sectioning plane of FIG. 17 is vertically aligned and across the center of stem 222 and opening 226 in a manner similar to the sectioning planes of FIGS. 6 through 8. Except as described below, customization frame 221 and sole structure 212 may be similar to customization frame 21 and sole structure 12.

Stem 222 includes a retaining ridge 261 that rests within a retention groove 262 formed in the wall of opening 226 and that keeps stem 222 in position. Because of the compressibility of the foam material used for midsole 217, however, the walls of opening 226 and grooves 262 can be non destructively deformed to allow installation of stem 222 by pushing stem 222 into opening 226 using moderate manual force. Similarly, stem 222 can be nondestructively removed by pulling frame 221 away from sole structure 212 using moderate manual force.

The structure shown in FIG. 17 may be representative of other stems 222 of frame 221 and representative of other openings 226 corresponding to those other stems 222. However, some or all of those other stems may be of different lengths and/or have a different projection end shape. In particular, the projection 242 of stem 222 in FIG. 17 has a length and end shape sufficient to partially close conduit 228. Other stems 222 of frame 221 may partially close other conduits 228 (to the same, a lesser, or greater degree than shown in FIG. 17), may not close other conduits 228, and/or may completely close other conduits 228.

FIG. 17 merely shows one example of a mechanical retaining means for nondestructively securing one or more stems of a customization frame in a sole structure. In other embodiments, other types of mechanical retaining means could also or alternatively be used. For example, a sole structure could have threaded receptacles, similar to receptacles used to hold cleats or other traction elements, located adjacent to openings. Branches of a customization frame could include holes that align with those receptacles when the customization frame is installed into the sole structure. Threaded fasteners could them be placed through those holes to secure the customization frame into place. As but another example, some or all of the openings in a sole structure could have twist-lock features formed in the opening walls, and stems could have corresponding twist-lock features. The opening wall and stem twist-lock features could be configured so that the stem slides into the opening when the stem has one rotational orientation about a vertical axis of the opening, but that secures the stem from removal when the stem has a different rotational orientation about that vertical axis of the opening. Some or all of the branches of such a frame could include elastic portions that allow twisting of some stems of the frame after other stems are installed into a sole structure.

In some embodiments, a bladder network may be formed from sheets of a material that is highly flexible and that is impervious to passage of fluid that will be contained within the bladder network. Those sheets may then be joined along multiple seams to define bladders and conduits. FIGS. 18A through 18D show fabrication of such a bladder network according to some embodiments.

Figure 18A:
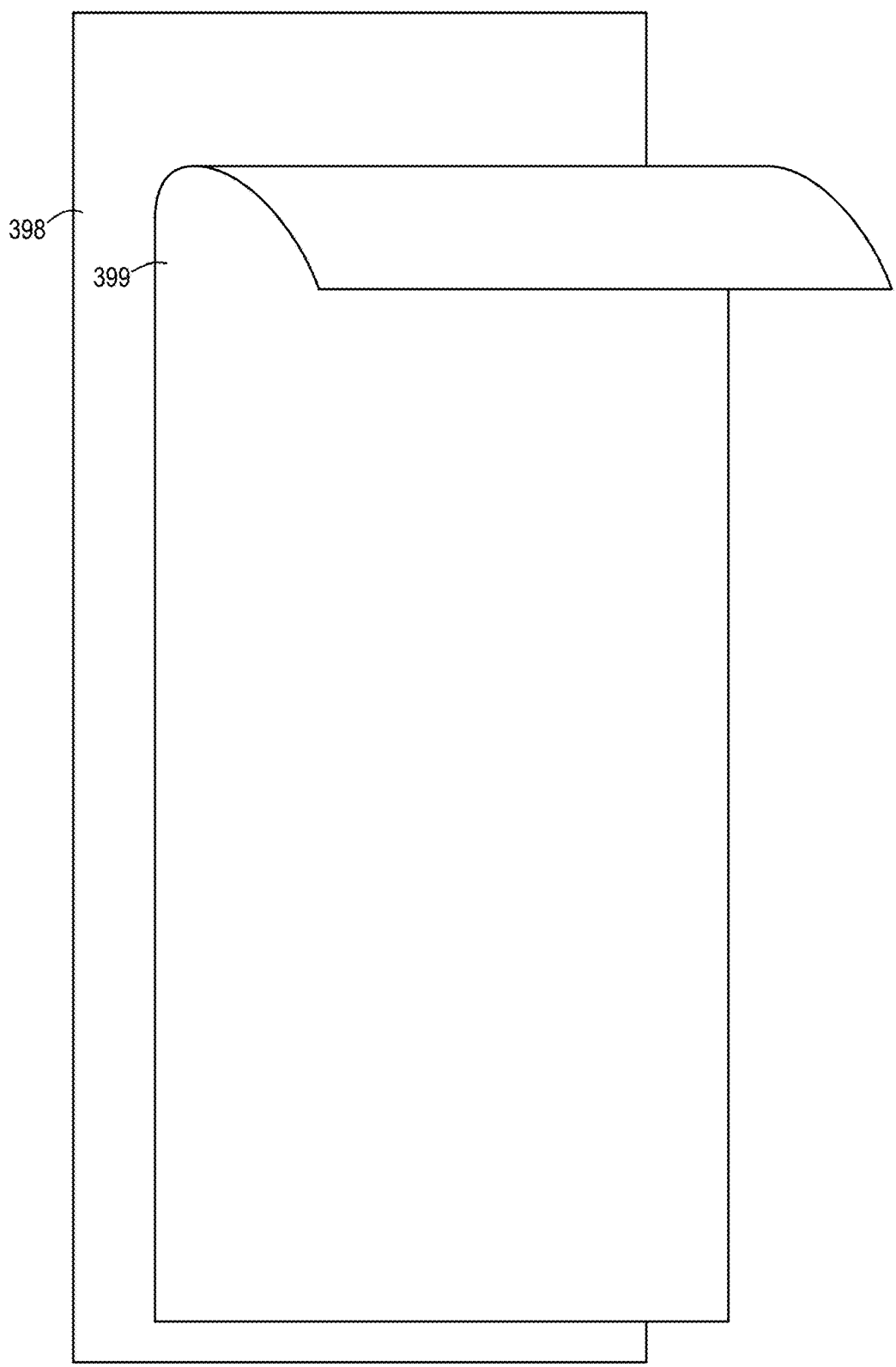
FIGS. 18A through 18D show fabrication of a bladder network according to some additional embodiments, and with FIG. 18D being a bottom side view of that bladder network.

FIG. 18A shows two sheets 398 and 399 of material prior to joining along seams. Examples of such materials that could be used for sheets 398 and 399 include, without limitation, fabrics treated with a polymeric material so as to provide a gas barrier. Without limitation, examples include woven and/or knitted textiles coated with thermoplastic polyurethane (TPU).

Figure 18B:
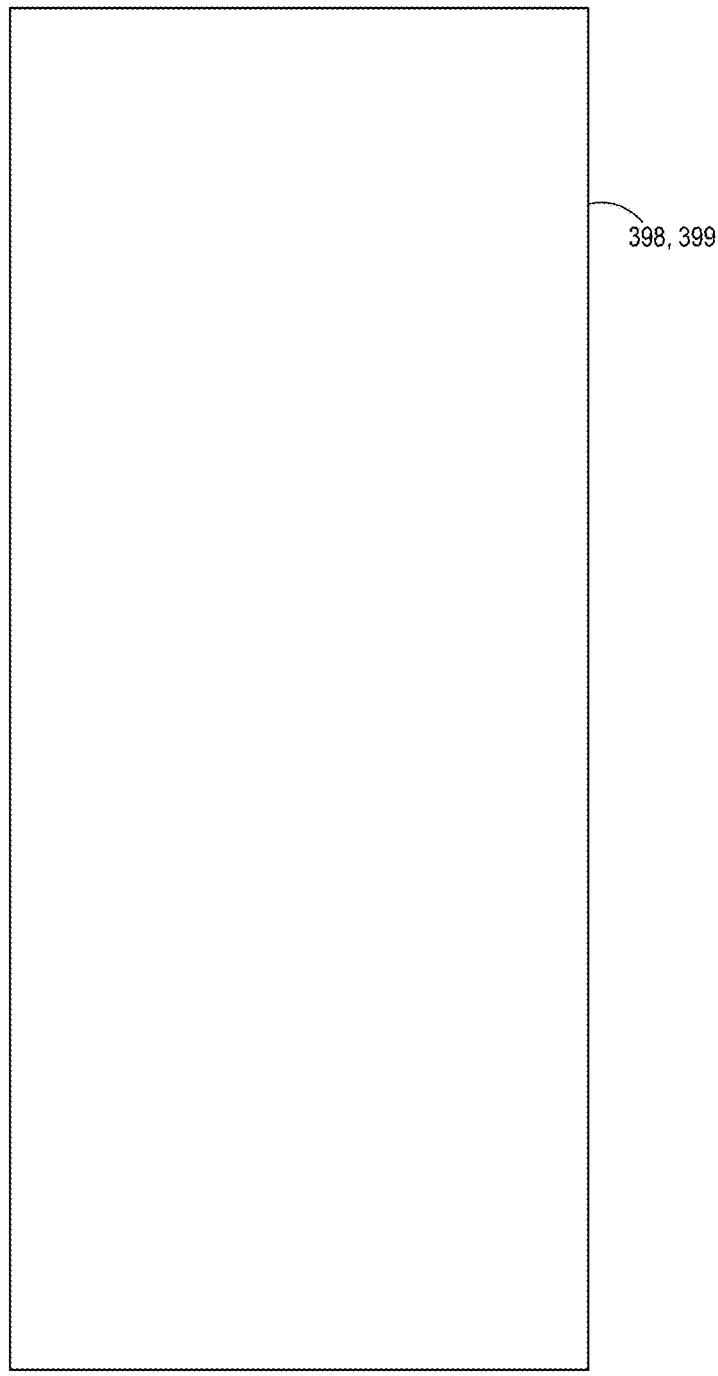
Figure 18C:
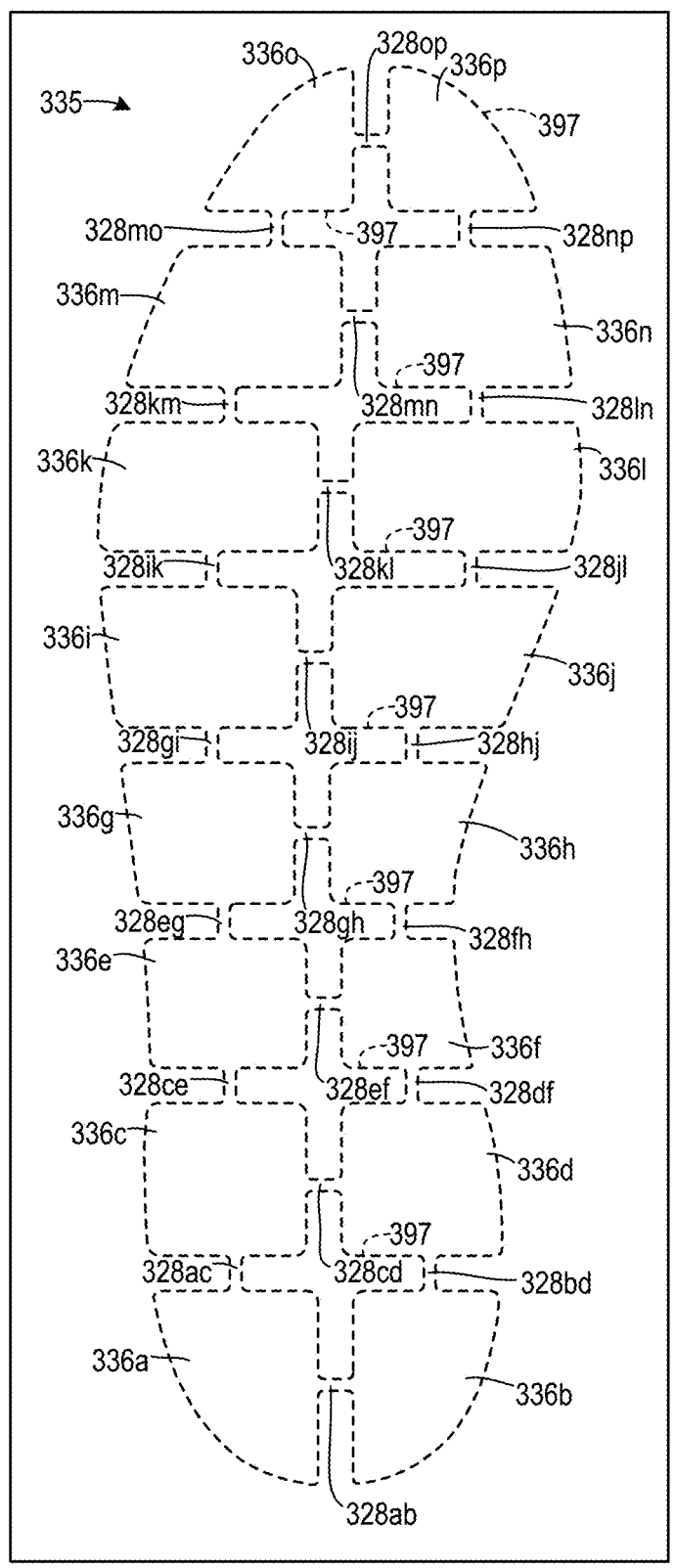
Figure 18D:
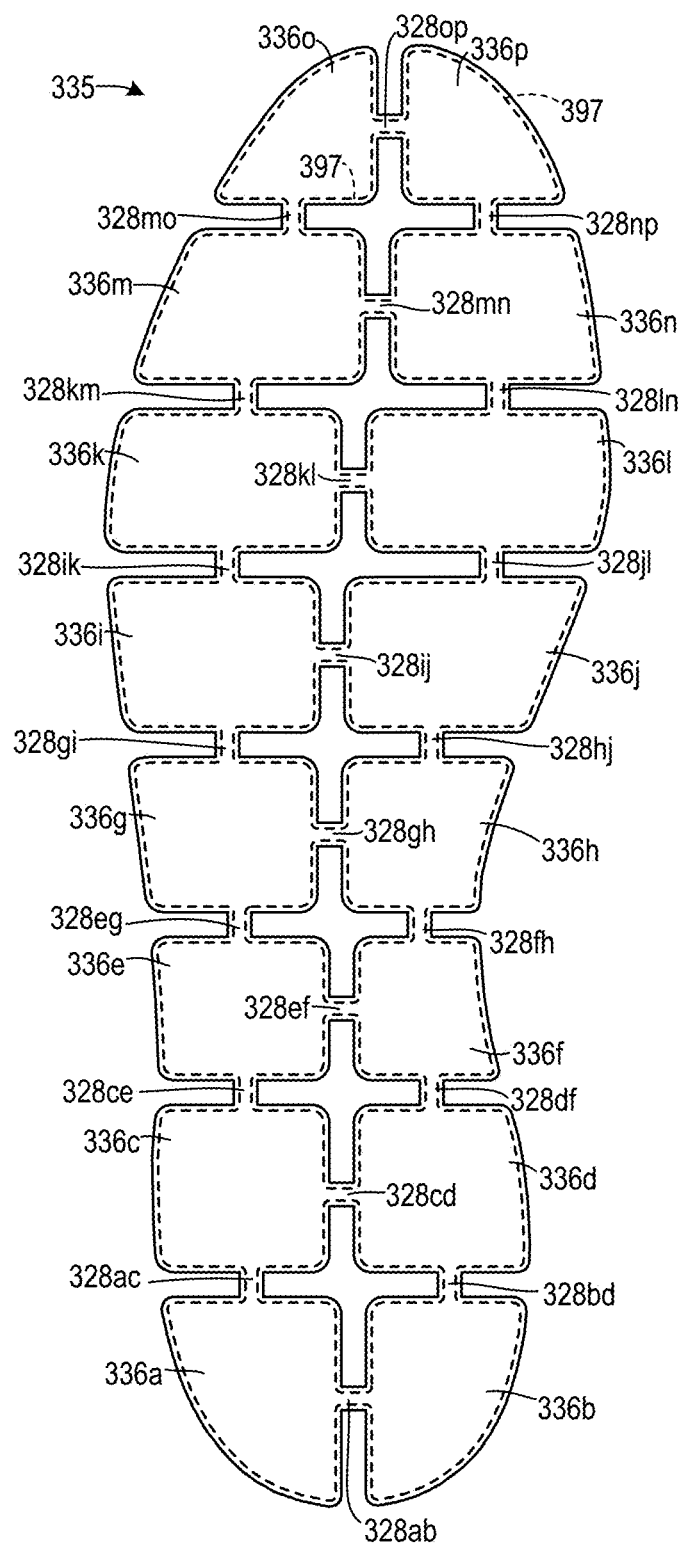

FIG. 18B shows sheets 398 and 399 aligned and placed one on top of the other. FIG. 18C shows sheets 398 and 399 after bonding (e.g., using RF welding) along seams 397 to define bladders 336a through 336p and conduits 328ab through 328op of a bladder network 335. Similar to bladders 36 and conduits 28 of bladder network 35, each of conduits 328 has an internal passage that may be in fluid communication with chambers of bladders 336 on opposite sides of that conduit. FIG. 18D shows bladder network 335 after trimming of excess portions of sheets 398 and 399 and filling with fluid. In some embodiments, bladder network 335 may be filled with fluid by inserting a needle into one of bladders 336 and pumping fluid into bladder network 335 through that needle. The needle may then be withdrawn and the hole created by the needle sealed. In some embodiments, a valve (not shown) can be installed in bladder network 335 and used for inflation.

Figure 19:
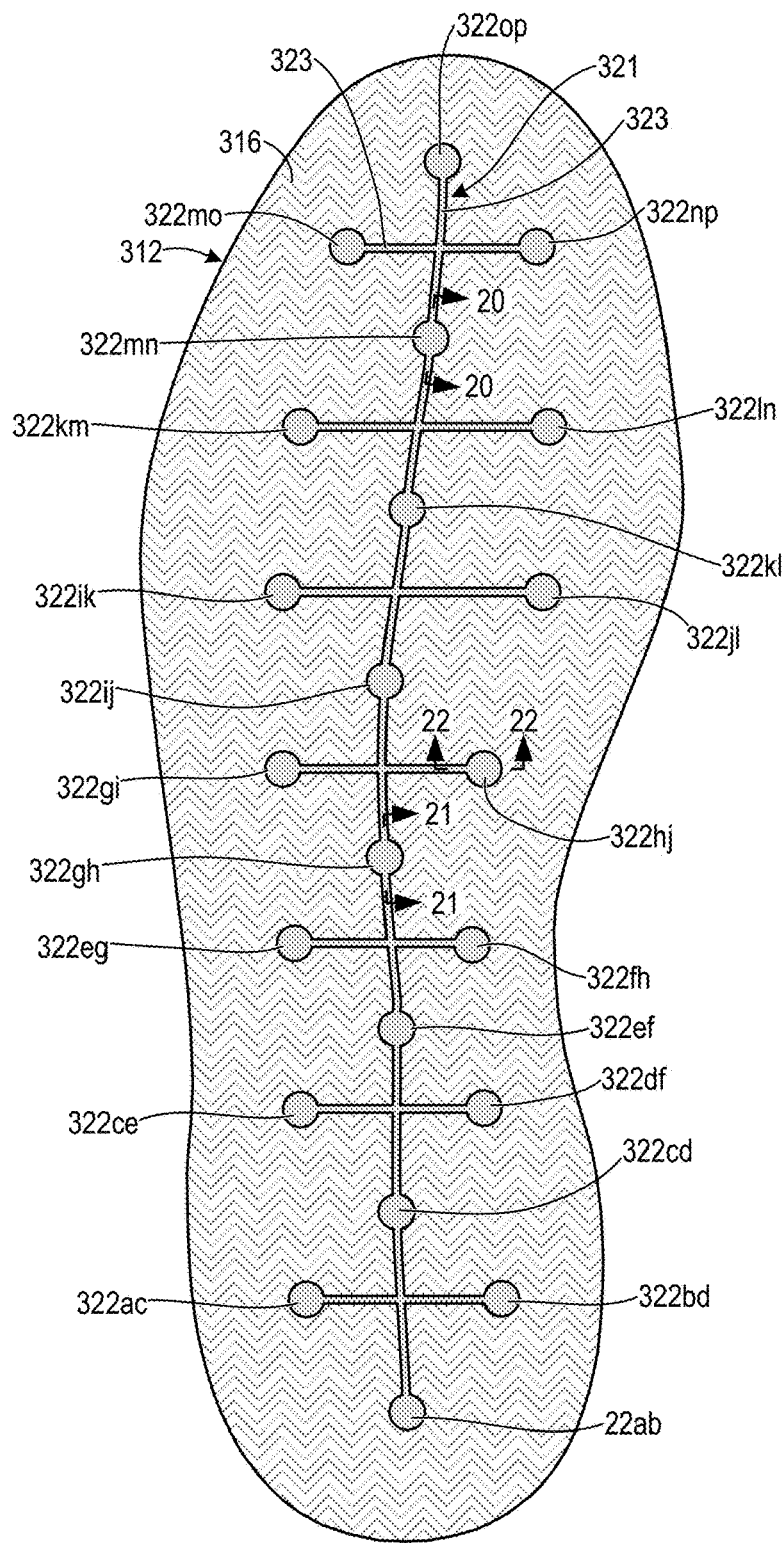
FIG. 19 is a bottom view of a sole structure incorporating the bladder network of FIG. 18D.

Bladder network 335 can then be incorporated in a shoe sole structure. FIG. 19 is a bottom view of shoe sole structure 312 into which bladder network 335 has been incorporated. Except as described herein, sole structure 312 (including customization frame 321) and the shoe of which sole structure 312 is a part may be similar to sole structure 12 and shoe 10 described previously. To avoid obscuring features of sole structure 312 and lead lines connecting those features with identifying reference numbers, the tread pattern of outsole 316 is shown in FIG. 19 using light lines.

Bladder network 335 is installed in sole structure 312 in manner similar to that in which bladder network 35 is installed in sole structure 12. In particular, sole structure 312 includes openings under conduits 328 and through which stems 322 of a customization frame 321 have been inserted. Bladders 336 and other parts of conduits 328 may be completely surrounded by midsole material into which bladder network 335 has been embedded.

Figure 20:
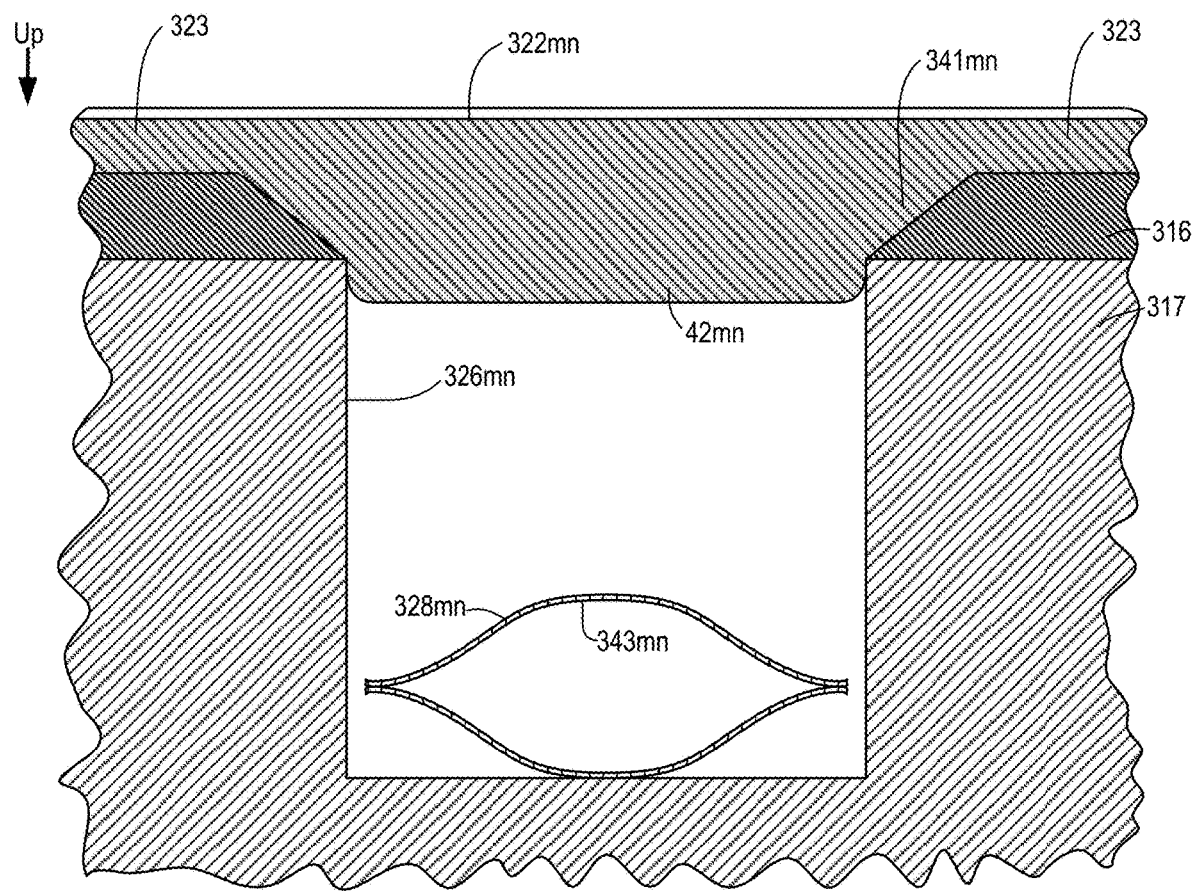
FIGS. 20 through 22 are partially schematic area cross-sectional views along the sectioning planes indicated in FIG. 19.

As with stems 22 of customization frame 21, some, none, or all of stems 322 may configured to fill an opening without closing a conduit. Similarly, some, none, or all of stems 322 may configured to partially or completely close a conduit. FIG. 20, a partially schematic area cross-sectional view along the sectioning plane indicated in FIG. 19 by arrows 20, shows an example of a stem 322 that does not close a conduit 328. As seen in FIG. 20, stem 322$mn$ includes a base 341$mn$ and an upward projection 342$mn$ inserted into opening 326$mn$. Upward projection 342$mn$ is relatively short and does not reach conduit 328$mn$. Because conduit 328$mn$ is not impinged upon or deformed by stem 322$mn$, the rate of fluid flow between the internal chamber of bladder 336$m$ and the internal chamber of bladder 336$n$, through internal passage 343$mn$ of conduit 28$mn$, is not affected by stem 322$mn$.

Figure 21:
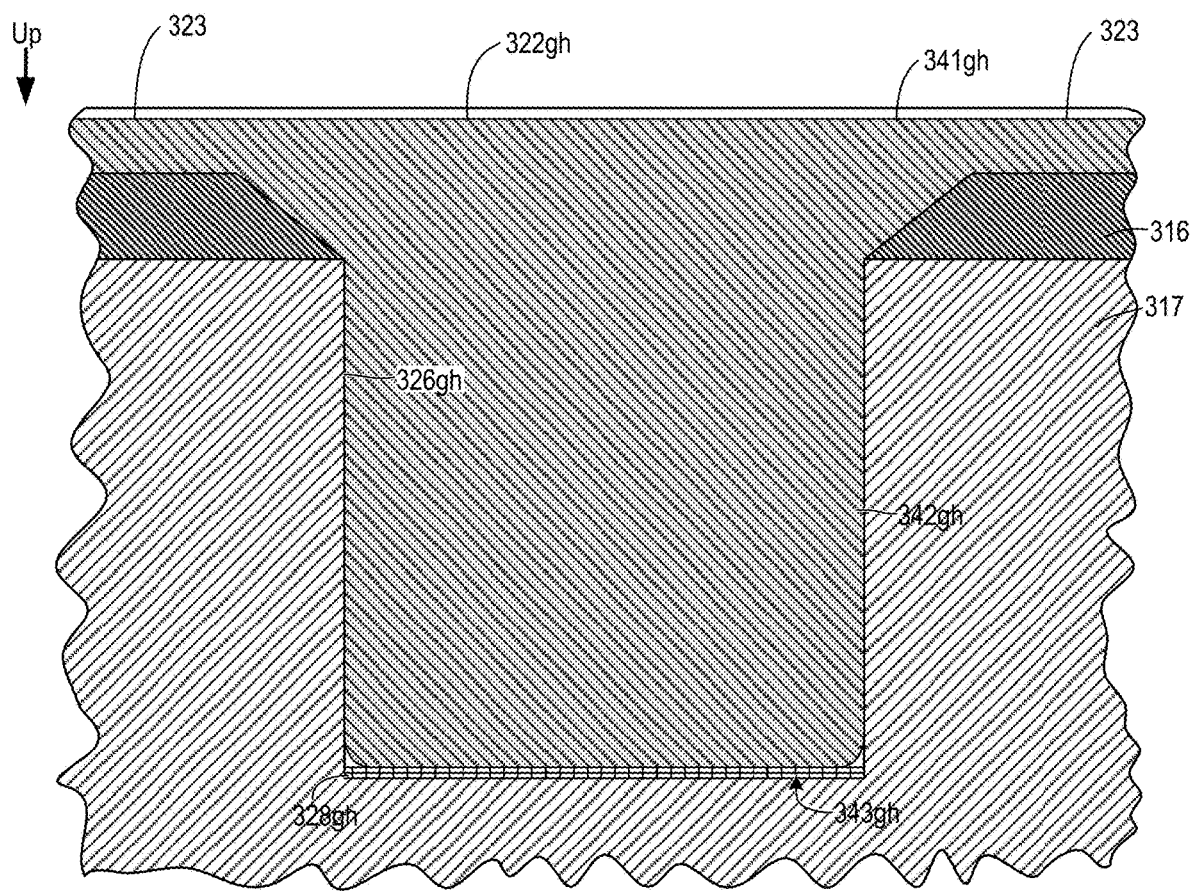

FIG. 21 is a partially schematic area cross-sectional view along the sectioning plane indicated in FIG. 19 by arrows 21. Stem 322$gh$ and its corresponding conduit 328$gh$ are visible in FIG. 21. Upward projection 342$gh$, which is inserted into opening 326$gh$, has a length and end shape configured to completely close conduit 328$gh$. The upper end of projection 342$gh$ contacts an outer surface 329$gh$ of conduit 328$gh$ and impinges upon and deforms conduit 328$gh$. In the case of conduit 328$gh$, that deformation completely closes internal passage 343$gh$ of conduit 328$gh$. As a result, fluid cannot flow between the inner chamber of bladder 336$g$ and the inner chamber of bladder 336$h$ through conduit 328$gh$.

Figure 22:
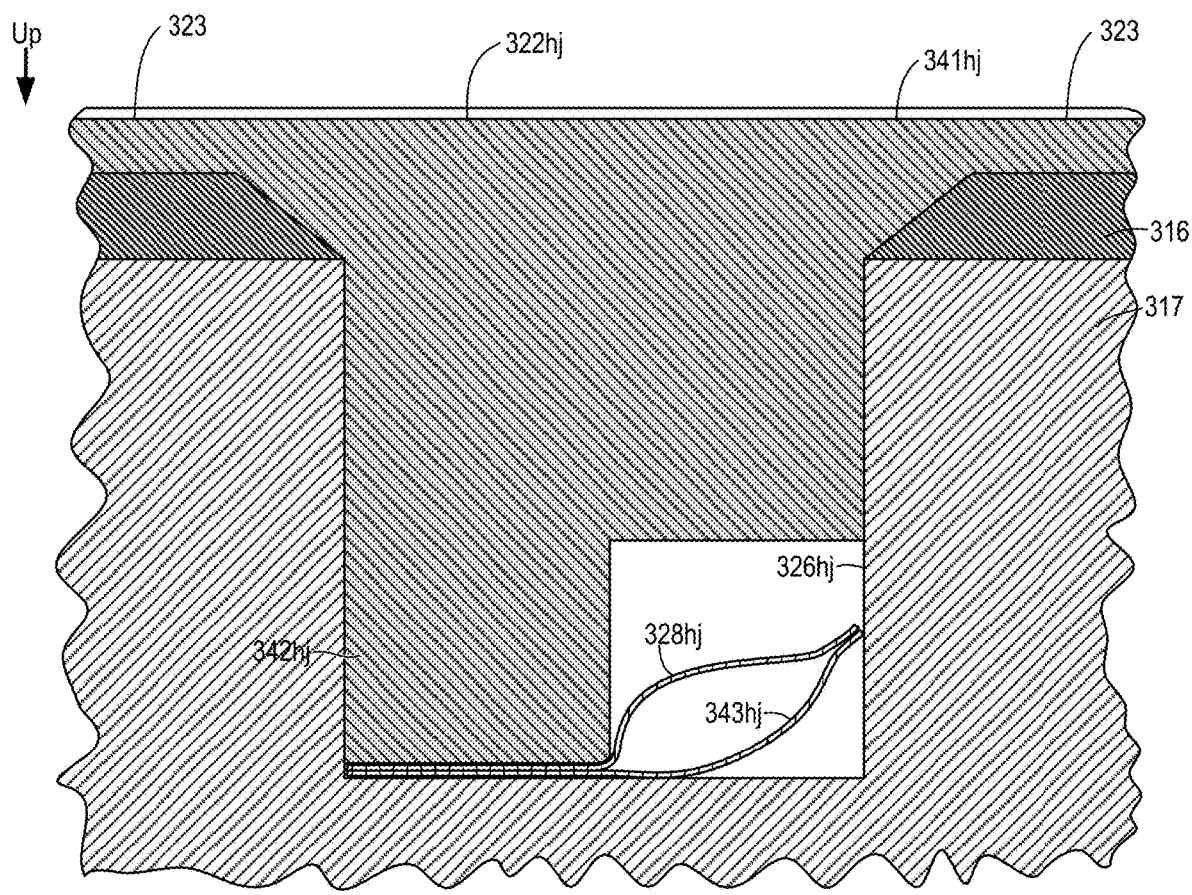

FIG. 22 is a partially schematic area cross-sectional view along the sectioning plane indicated in FIG. 19 by arrows 22. Stem 322$hj$ and its corresponding conduit 328$hj$ are visible in FIG. 22. Upward projection 342$hj$ has been inserted into opening 326$hj$ and has a length and end shape configured to partially close conduit 328$hj$. The upper end of projection 342$hj$ contacts the outer surface 329$hj$ of conduit 28$hj$. The upper end of projection 342$hj$ has a smaller surface area than the upper end of projection 342$gh$, however. As a result, and although projection 342$hj$ impinges upon and deforms conduit 328$hj$, conduit 328$hj$ is not completely closed. Instead, the deformation resulting from the impingement by projection 342$hj$ changes the shape of internal passage 343$hj$ so as to leave a smaller flow area. This deformation effects a partial closing of internal passage 343$hj$, as the rate at which fluid can flow between bladder 336$h$ and bladder 336$j$ is reduced relative to what that flow rate would be if conduit 328$hj$ were not deformed.

Each of the other stems 322 of customization frame 321 has an upward projection with a length and end shape chosen based on the desired affect on flow rate through the conduit 328 corresponding to that stem. One or more of those other stems 322 may have an upward projection with a configuration similar to that of upward projection 342$mn$ (FIG. 20) and may not impinge upon or deform the corresponding conduit 328. One or more of those other stems 322 may have an upward projection with a configuration similar to that of upward projection 342$gh$ (FIG. 21) and may impinge upon and deform the corresponding conduits 328 so as to completely close those conduits. One or more of those other stems 322 may have an upward projection with a configuration similar to that of upward projection 342$hj$ (FIG. 22) and may impinge upon and deform the corresponding conduits 328 so as to partially close those conduits. The degree of partial closing may be the same as, greater than, or less than that shown in FIG. 22. To partially close a conduit to a greater degree than is shown in FIG. 22, an end of an upward projection 342 may have a larger surface than the end of projection 342$hj$, but a smaller surface that the end of projection 342$gh$. To partially close a conduit to a lesser degree than is shown in FIG. 22, an end of an upward projection 342 may have a smaller surface than the end of projection 342$hj$.

As with customization frame 21, all combinations of configurations for stems 322 are with the scope of the disclosure. Stems 322 and openings 326 may be round in cross section similar to stems 22 and opening 26. However, stems and openings could have other shapes. In some embodiments a customization frame may be permanently installed in a sole structure such as sole structure 312. In other embodiments, a customization frame may be nondestructively removable from and replaceable into a sole structure such as sole structure 312. In some such embodiments, mechanical retaining means for nondestructively securing one or more stems of a customization frame in a sole structure, such as are described above, may be used. In some embodiments, a customization frame used in connection with a sole structure such as sole structure 312 could include different lengths of stems (similar to customization frame 21) to vary the degree to which corresponding conduits are closed, but with all stem projections having similarly shaped upper ends.

Figure 23:
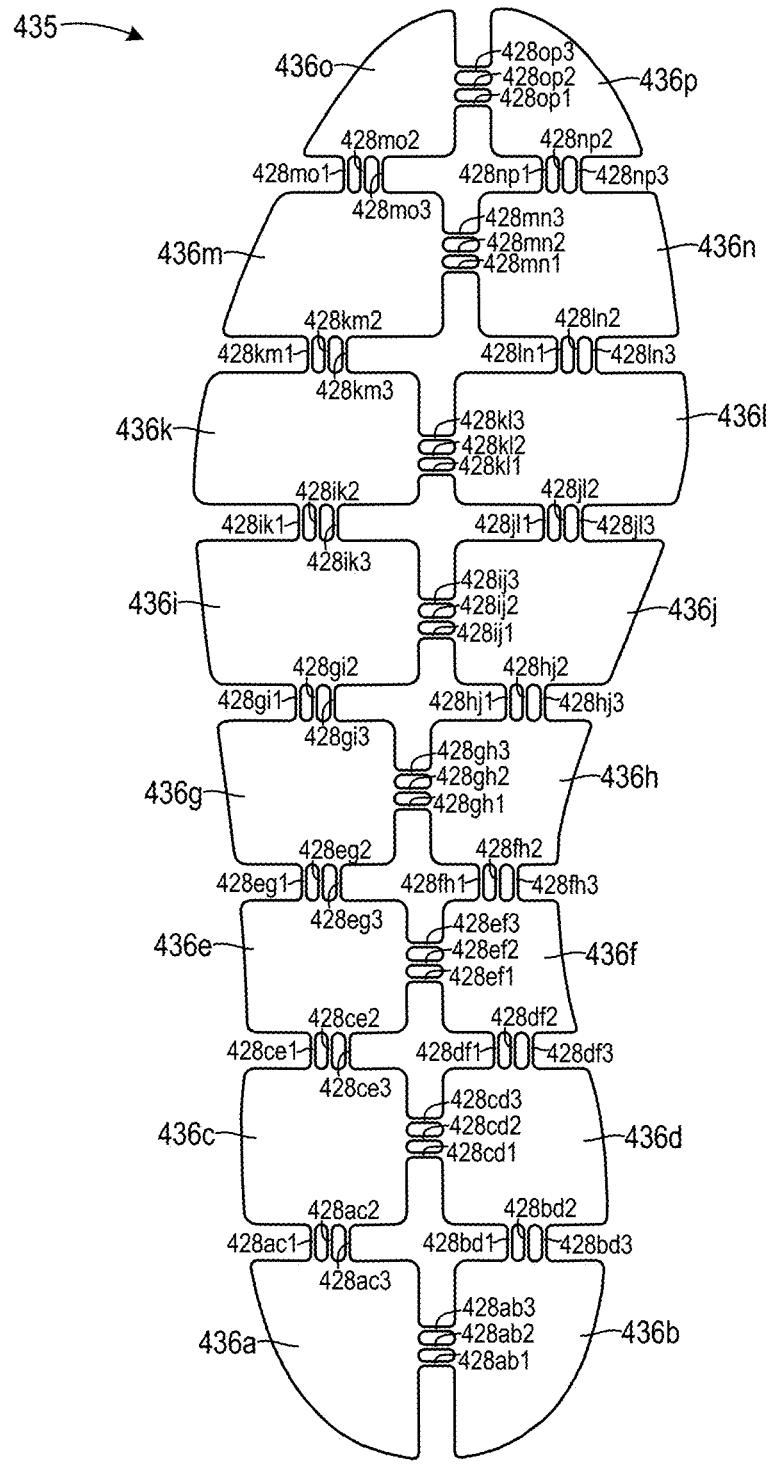
FIG. 23 is a bottom side view of a bladder network according to some further embodiments.
Figure 24:
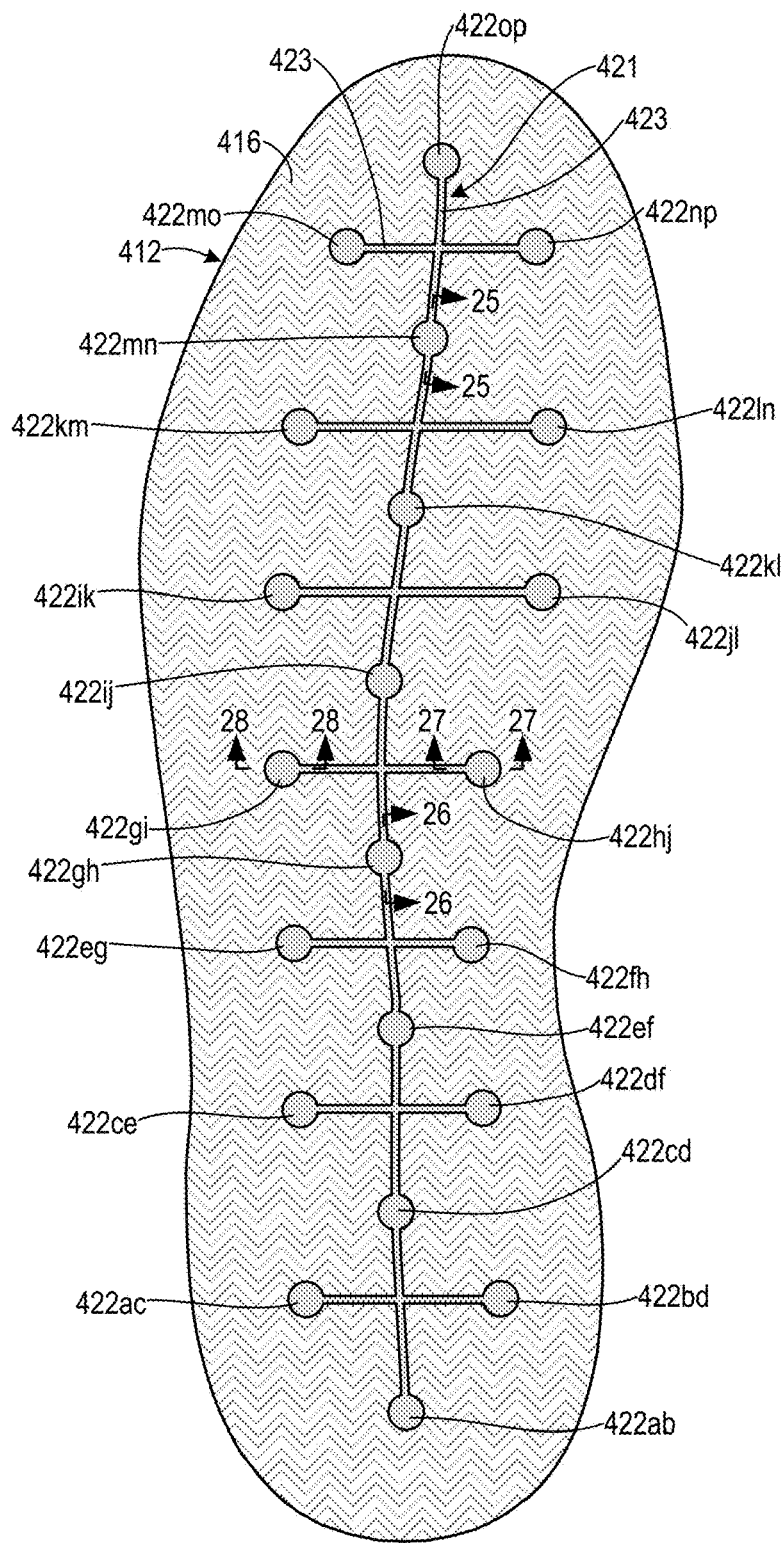
FIG. 24 is a bottom view of a sole structure incorporating the bladder network of FIG. 23.

FIG. 23 is a bottom view of a bladder network 435 according to some additional embodiments. Bladder network 435 is similar to bladder network 35 and includes bladders 436$a$ through 436$p$. Bladder network 435 may be formed from materials similar to those described in connection with bladder network 35. Unlike bladder network 35, however, connections between adjacent bladders 436 comprise three conduits 428. For example, bladders 436$a$ and 436$b$ are connected by conduits 428$ab1$, 428$ab2$, and 428$ab3$, bladders 436$a$ and 436$c$ are connected by conduits 428$ac1$, 428$ac2$, and 428$ac3$, etc. FIG. 24 is a bottom view of a shoe sole structure 412 that incorporates bladder network 435. Except as described below, sole structure 412 (including customization frame 421) and the shoe of which it is a part may be similar to sole structure 12 and shoe 10. To avoid obscuring features of sole structure 412 and lead lines connecting those features with identifying reference numbers, the tread pattern of outsole 416 is shown in FIG. 24 using light lines.

Bladder network 435 is installed in sole structure 412 in manner similar to that in which bladder network 35 is installed in sole structure 12. In particular, sole structure 412 includes openings under conduits 428 and through which stems 422 of a customization frame 421 have been inserted. Bladders 436 and other parts of conduits 428 may be completely surrounded by midsole material into which bladder network 335 has been embedded.

Figure 25:
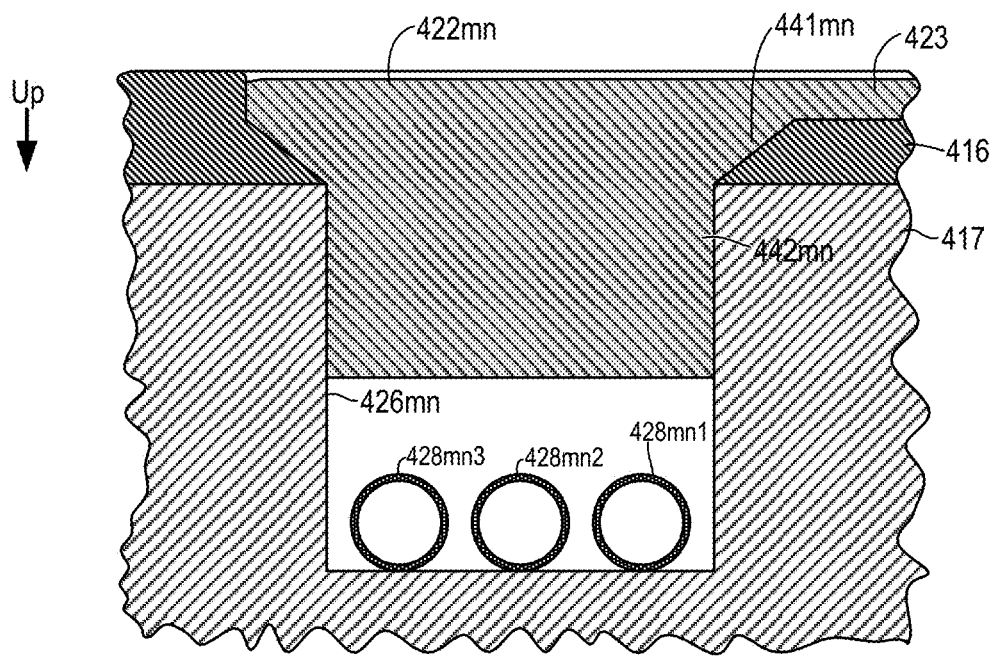
FIGS. 25 through 28 are partially schematic area cross-sectional views along the sectioning planes indicated in FIG. 24.

In the embodiment of sole structure 412, fluid flow between adjacent bladders 436 is controlled by closing none, some, or all of the conduits 428 between those bladders. FIG. 25, a partially schematic area cross-sectional view along the sectioning plane indicated in FIG. 24 by arrows 25, shows an example of a stem 422 that does not close any conduits 428. As seen in FIG. 25, stem 422mn includes a base 441mn and an upward projection 442mn inserted into opening 426mn. Upward projection 442mn does not reach any of conduits 428mn1, 428mn2, or 428mn3. Because none of conduits 428mn1, 428mn2, or 428mn3 is impinged upon or deformed by stem 422mn, the rate of fluid flow between the internal chamber of bladder 436m and the internal chamber of bladder 436n, through internal passages of conduits 428mn1, 428mn2, and 428mn3, is not affected by stem 428mn.

Figure 26:
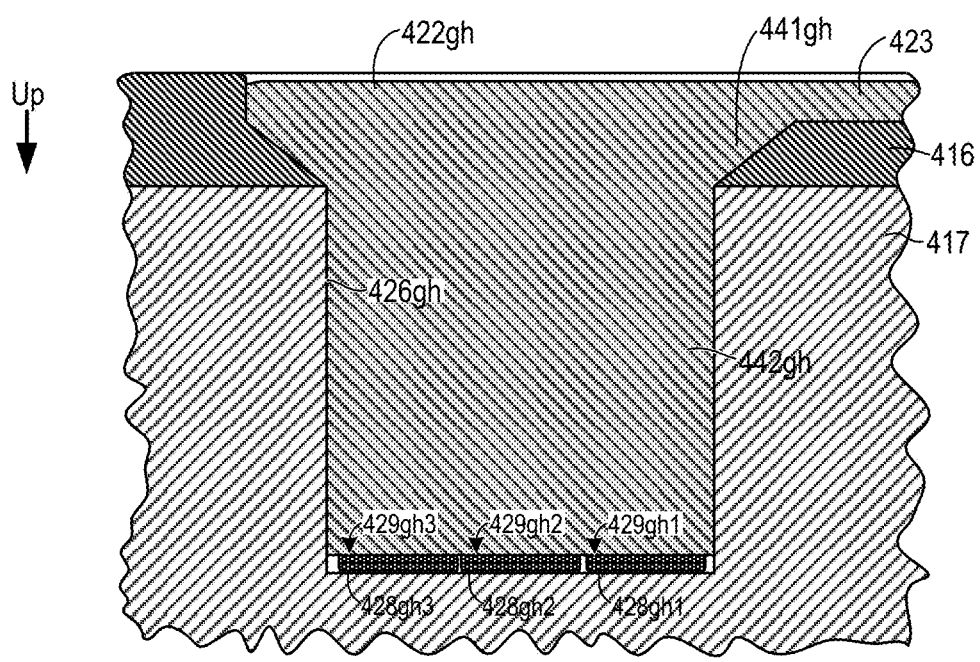

FIG. 26 is a partially schematic area cross-sectional view along the sectioning plane indicated in FIG. 24 by arrows 26. Stem 422gh and its corresponding conduits 428gh1, 428gh2, and 428gh3 are visible in FIG. 26. Upward projection 442gh, which is inserted into opening 426gh, has a length and end shape configured to close all of conduits 428gh1, 428gh2, and 428gh3. The upper end of projection 442gh contacts outer surfaces 429gh1, 429gh2, and 429gh3 of conduits 428gh1, 428gh2, and 428gh3 and impinges upon, deforms and completely closes conduits 428gh1, 428gh2, and 428gh3. As a result, fluid cannot flow between the inner chamber of bladder 436g and the inner chamber of bladder 436h through any of conduits 428gh1, 428gh2, and 428gh3.

Figure 27:
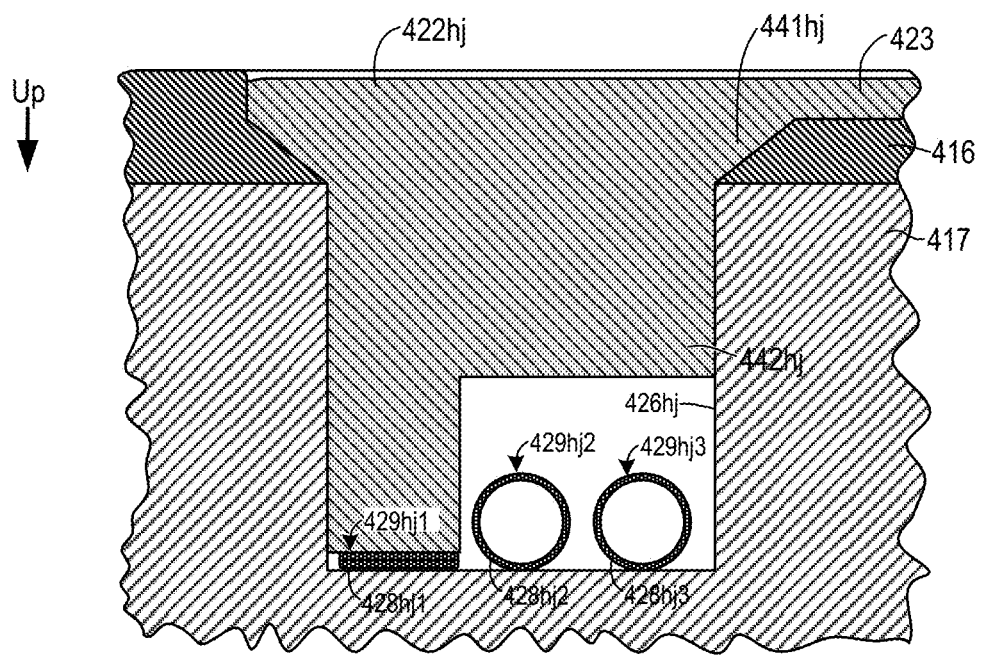

FIG. 27 is a partially schematic area cross-sectional view along the sectioning plane indicated in FIG. 24 by arrows 27. Stem 422hj and its corresponding conduits 428hj1, 428hj2, and 428hj3 are visible in FIG. 27. Upward projection 442hj has been inserted into opening 426hj. Projection 442hj contacts the outer surface 429hj1 of, and impinges upon, deforms and closes, conduit 428hj1. The upper end of projection 442hj has an end shape that does not impinge upon, deform, or close conduits 428hj2 and 428hj3. As a result, the rate at which fluid can flow between bladder 436h and bladder 436j is reduced relative to what that flow rate would be if none of conduits 428hj1, 428hj2, or 428hj3 were closed, but that reduction is less than what it would be if two of conduits 428hj1, 428hj2, and 428hj3 were closed.

Figure 28:
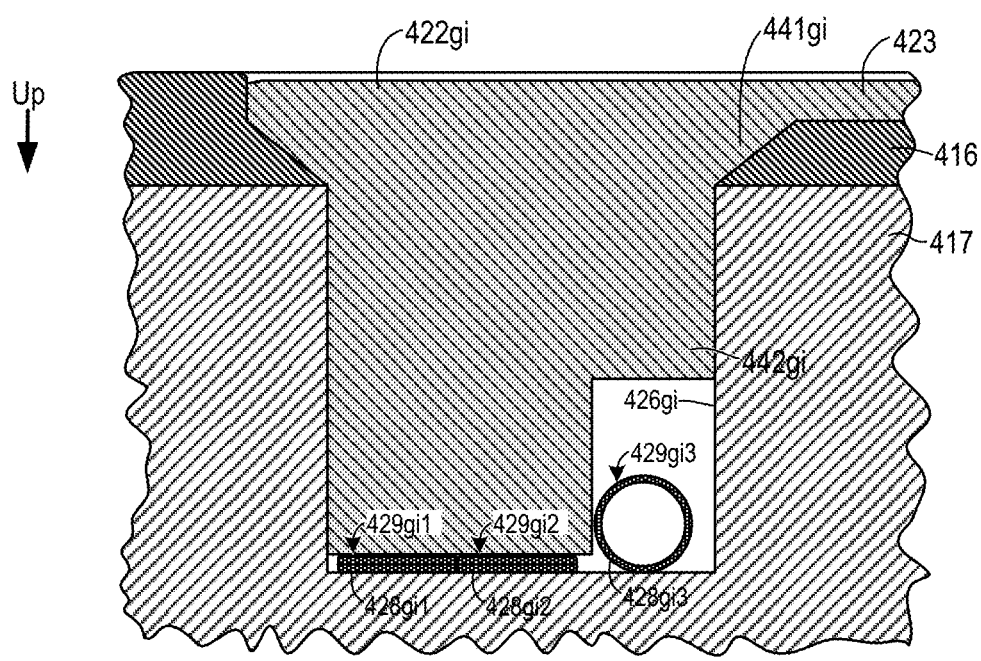

FIG. 28 is a partially schematic area cross-sectional view along the sectioning plane indicated in FIG. 24 by arrows 28. Stem 422gi and its corresponding conduits 428gi1, 428gi2, and 428gi3 are visible in FIG. 28. Upward projection 442gi has been inserted into opening 426gi. Projection 442gi contacts the outer surface 429gi1 of, and impinges upon, deforms and closes, conduit 428gi1. Projection 442gi also contacts the outer surface 429gi2 of, and impinges upon, deforms and closes, conduit 428gi2. The upper end of projection 442gi has an end shape that does not impinge upon, deform, or close conduit 428gi3. As a result, the rate at which fluid can flow between bladder 436g and bladder 436i is reduced relative to what that flow rate would be if only one of conduits 428gi1, 428gi2, and 428gi3 were closed, but that reduction is less than what it would be if all of conduits 428gi1, 428gi2, and 428gi3 were closed.

Each of the other stems 422 of customization frame 421 has an upward projection with a configuration similar to what is shown in one of FIGS. 25 through 28 and that is chosen based on the desired effect on flow rate through the conduit 428 corresponding to that stem. All combinations of configurations for stems 422 are with the scope of the disclosure. Stems 422 and openings 426 may be round in cross section similar to stems 22 and opening 26. However, stems and openings could have other shapes. In some embodiments a customization frame may be permanently installed in a sole structure such as sole structure 412. In other embodiments, a customization frame may be nondestructively removable from and replaceable into a sole structure such as sole structure 412. In some such embodiments, mechanical retaining means for nondestructively securing one or more stems of a customization frame in a sole structure, such as are described above, may be used.

Figure 29:
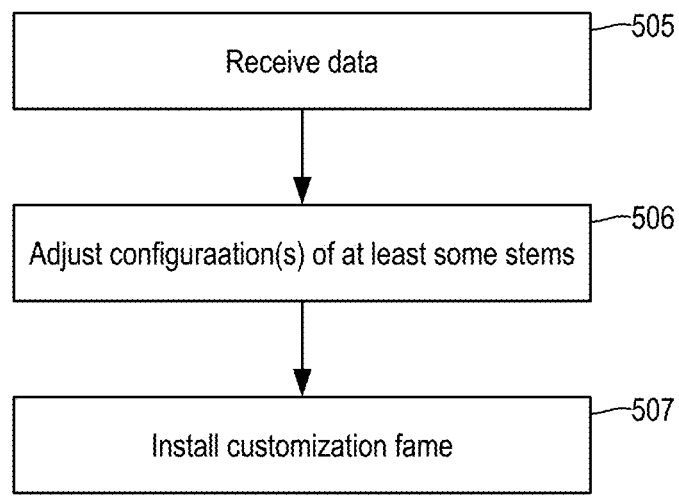
FIG. 29 is a flow chart showing steps in a method according to some embodiments.

FIG. 29 is a flow chart showing steps in a method according to some embodiments. In step 505, data relating to a cushioning profile for a shoe is received. In some embodiments, the data may include (i) data identifying which, if any, conduits of a bladder network are to be completely closed, (ii) data identifying which, if any, conduits of that bladder network are to be completely open, and/or (iii) data identifying which, if any conduits of that bladder network are to be partially closed, and for any such conduits, an amount of partial closure. In step 506, and based on the data received in step 505, configurations of at least some stems in a customization frame are adjusted. Adjusting a stem configuration can include adjusting a length of a stem and/or adjusting a shape of an end of a stem. In some embodiments, adjusting may include initially fabricating one or more stems to have a desired configuration. In some embodiments, adjusting may include trimming one or more stems of a prefabricated frame (such as is described in connection with FIGS. 15 and 16). In step 507, the customization frame for which stems configurations were adjusted in step 506 is installed in a sole structure. In some embodiments, the installation in step 507 may be permanent and may include gluing or otherwise bonding the customization frame into place. In other embodiments, the installation in step 507 may be non permanent and may comprise fastening the frame into position using one or more mechanical retaining means as described above.

In some embodiments, stems and/or an entire customization frame may be created using one or more rapid prototyping techniques. Examples of rapid prototyping techniques include, without limitation, 3D printing and laser sintering.

Although various portions of the foregoing description were in the context of a single shoe, it is to be appreciated that shoes are normally produced and used in pairs. Accordingly, any description herein of a feature applicable to a sole structure of one shoe is understood to also apply to a sole structure of another shoe in a pair of shoes. A pair of customization frames for a pair of shoes need not be exact mirror images of one another. For example, a customization frame for a right shoe may create a first cushioning profile in the right shoe sole structure and a customization frame for a left shoe may create a second cushioning profile in the left shoe sole structure. The first and second cushioning profiles could be dissimilar.

Other embodiments include numerous additional variations on the components and combinations described above. Without limitation, such variations may include one or more of the following.

Figure 30:
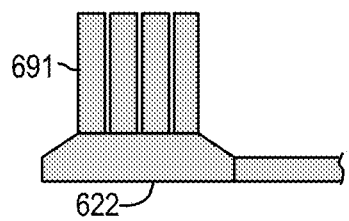
FIG. 30 shows a stem of a customization frame according to another embodiment.

A standardized frame could have prefabricated stems that include features to facilitate trimming to adjust end shapes of the stems. One example of such a stem is shown in FIG. 30. Stem 622 is part of a customization frame similar to customization frame 321 or customization frame 421 and may be used, e.g., in connection with sole structures such as sole structure 312 or sole structure 412. Other stems 622 in the customization frame may be similar. Stem 622 includes multiple tabs 691, each of which may be removed (e.g., with a knife). If a corresponding conduit or set of conduits is to be completely closed, all of tabs 691 on stem 622 may be left in place. If a corresponding conduit or set of conduits is to be partially closed, less than all tabs 691 on stem 622 may be removed. If a corresponding conduit or set of conduits is to be completely left completely open, all tabs 691 on stem 622 may be removed.

Figure 31:
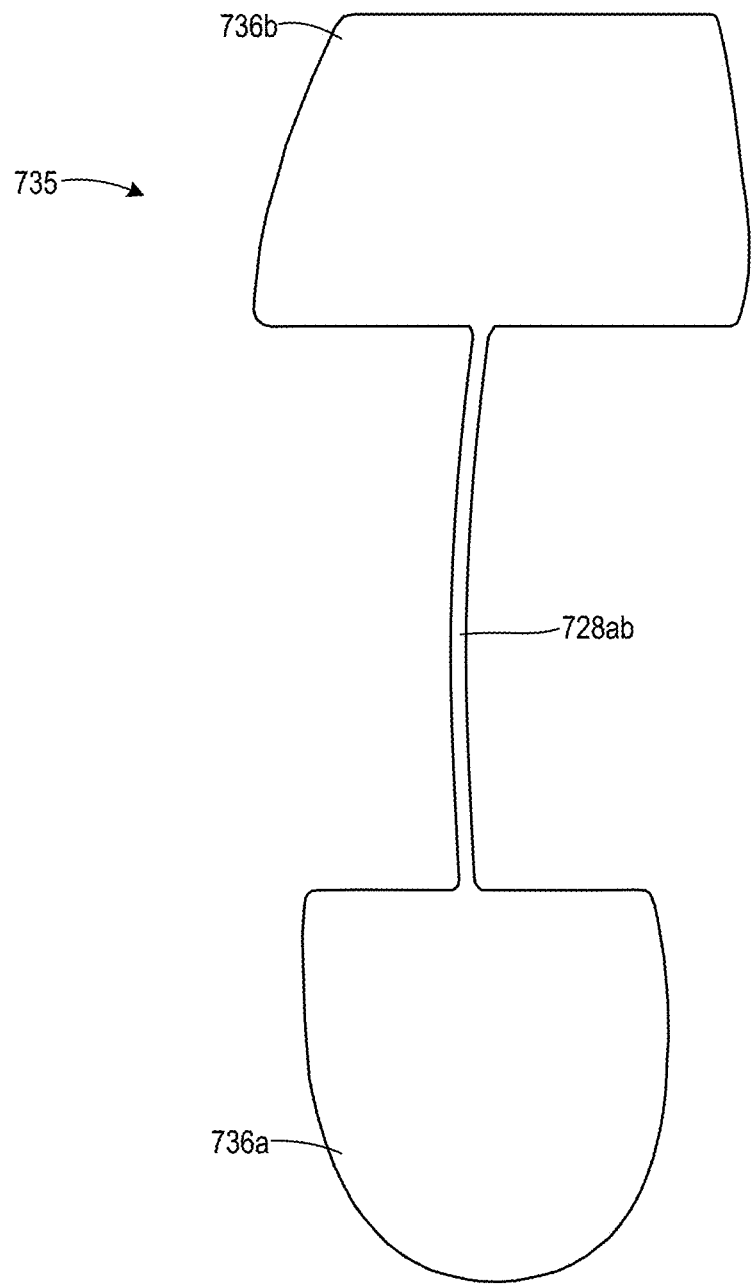
FIG. 31 is a bottom side view of a bladder network according to some additional embodiments.
Figure 32:
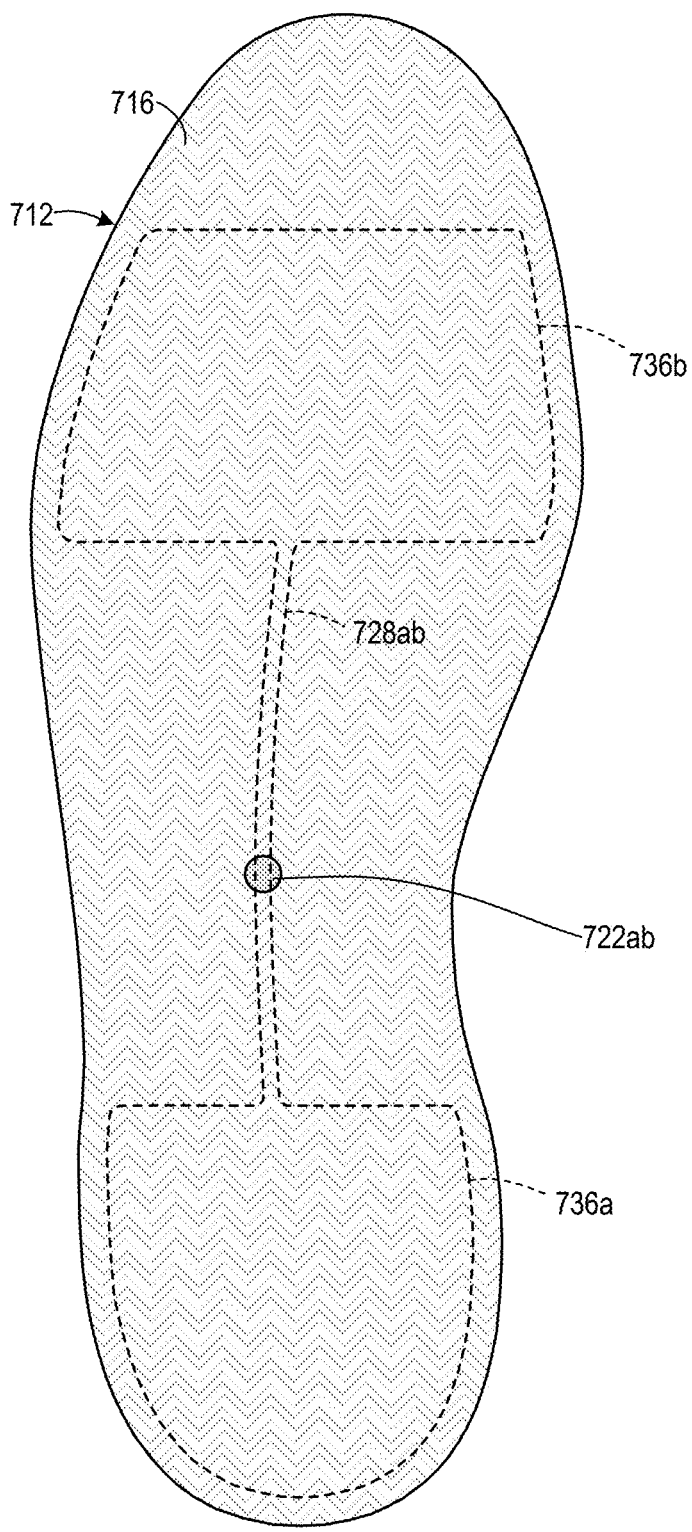
FIG. 32 is a bottom view of a sole structure incorporating the bladder network of FIG. 31.

In some embodiments, a bladder network may only include a single conduit connecting two bladders. FIG. 31 is a bottom view of a bladder network 735 according to one such embodiment. Bladder network 735, which may be formed from materials similar to those described in connection with other embodiments, includes a heel region bladder 736a, a forefoot region bladder 736b, and a conduit 728ab that has an internal passage through which can flow between chambers of bladders 735a and 735b. FIG. 32 is a bottom view of a shoe sole structure 712 that incorporates bladder network 735. Sole structure 712 may include an outsole 716. A single stem 722ab may be inserted into an opening through sole structure 712 that exposed conduit 728ab prior to insertion of stem 722ab. An upward projection of stem 722ab may have a length such that stem 722ab does not impinge upon or deform conduit 728ab (similar to the configuration shown in FIG. 6), a length such that stem 722ab impinges upon and deforms conduit 728ab so as to completely close conduit 728ab (similar to the configuration shown in FIG. 7), or a length such that stem 722ab impinges upon and deforms conduit 728ab so as to partly close conduit 728ab (similar to the configuration shown in FIG. 8). Sole structure 712 and the shoe of which it is a part may otherwise be similar to sole structure 12 and shoe 10. In some embodiments, a single stem such as stem 722ab may be part of a frame (e.g., so as to make insertion and/or removal easier) and/or may include mechanical retaining means (such as described above in connection with other embodiments) for nondestructively securing that stem in a sole structure. Locations and/or shapes of bladders 736a and 736b, of conduit 728ab, of stem 722ab, and of the opening through which stem 722ab is inserted could vary. In some embodiments, for example, a two bladder, one conduit network could include medial and lateral forefoot region bladders with a conduit extending between those bladders in a transverse direction.

Figure 33:
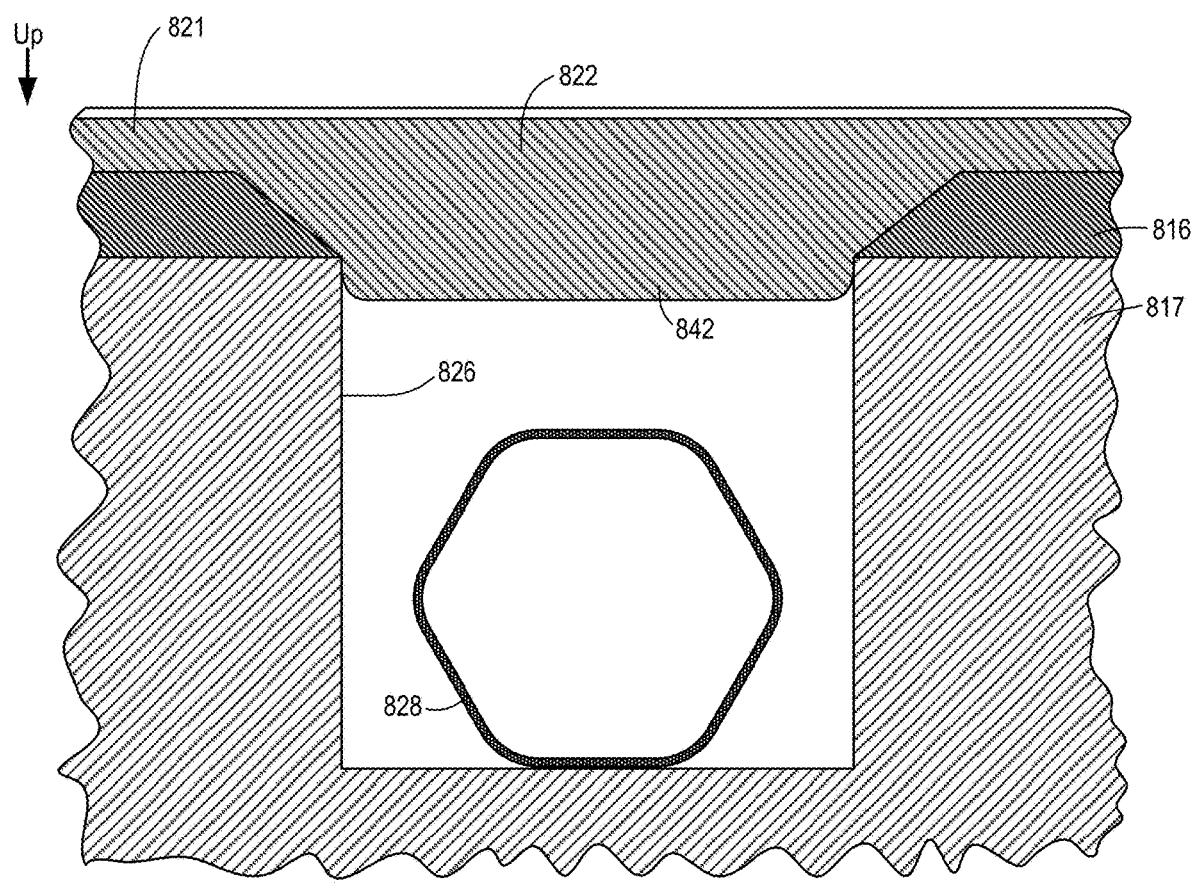
FIG. 33 is a partially schematic area cross-sectional view of a region surrounding a conduit according to some additional embodiments.

In some embodiments, conduits may have other shapes in cross-sectional planes perpendicular to flow direction. As but one example thereof, FIG. 33 shows a conduit 828 having a rounded hexagonal shape. FIG. 33 is a partially schematic area cross-sectional view along a sectioning plane passing through an opening 826 (similar to one of openings 26) through an outsole 816 and midsole 817 of a sole structure similar to sole structure 12. Also shown is a portion of a frame 821 including a stem 822. To avoid obscuring the uncompressed shape of conduit 828, stem 822 is shown with a short projection 842. However, stem 822 could have a projection that completely closes conduit 828 (similar to the configuration of FIG. 7) or that partially closes conduit 828 (similar to the configuration of FIG. 8). The bladder network of which conduit 828 is part may be similar to bladder network 35, but with other conduits also having a cross-sectional shape similar to that shown in FIG. 33.

Other aspects of a customization frame can be varied. For example, branches connecting stems could have a flatter and thinner profile to reduce effects of the frame on flexibility of a sole structure. A frame may be created from multiple materials, e.g., a first type of material for branches and a second type of material for stems, with the second type of material being stiffer than the first type of material.

A sole structure such as one of those described herein may include one or more valves through which fluid may be introduced (e.g., by a pump) into a bladder network. Such a valve could be located, e.g., on a medial midfoot edge of a sole structure and could include, e.g., a Schrader or Presta valve.

A bladder network could include bladders having shapes and relative positions different from the shapes and relative positions described thus far. A bladder network could also or alternatively include more or fewer bladders, and/or may cover a greater or lesser percentage of a sole structure plantar area, than the bladder networks described thus far. Connections between bladders need not be limited to conduits connecting adjacent bladders. In some embodiments, a bladder network may also or alternatively include conduits connecting non-adjacent bladders.

In some embodiments, and as indicated above, a bladder network may contain a fluid that is a gas. In some embodiments, a bladder network may contain an incompressible fluid that is a liquid (e.g., water).

In some embodiments, a stem may have a length selected so as to effect a partial closing of a conduit under light impact (e.g., from walking), but which effects a complete closing of that conduit under heavier impact (e.g., from running). In some such embodiments, the stem partially closes the conduit in a manner similar to that shown in FIG. 8, 17, or 22. The midsole structure in the portion of the midsole above the conduit portion contacted by the stem may then have a density that is selected so as to compress under high impact during running (thereby pinching the conduit completely closed), but that does not significantly compress under light impact while walking (thereby allowing the conduit to remain partially open).

In some embodiments, a sole structure may include an embedded bladder network similar to one of the embodiments described above, but may be configured so that a customization frame is installed from a top side of the sole structure. For example openings in a midsole could be located over conduits instead of below conduits. Within the upper of the shoe that includes the sole structure, portions of the strobel or other lasting element over the openings could be removed to allow stems to reach into the openings and close conduits. Channels may also be cut into the lasting element to accommodate branches of a frame that includes those stems.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. Any and all combinations, subcombinations and permutations of features from herein-described embodiments, whether or not such combination, subcombination, or permutation is expressly recited above or below, are the within the scope of the invention. In the claims, a reference to a potential or intended wearer or a user of a component does not require actual wearing or using of the component or the presence of the wearer or user as part of the claimed invention.

For the avoidance of doubt, the present application includes the subject-matter described in the following numbered paragraphs (referred to as "para." or "paras."):

1. A sole structure comprising a midsole; a bladder network, the bladder network including first and second bladders interconnected by a conduit, wherein at least a portion of the bladder network contains a fluid, and wherein the bladder network is at least partially incorporated into the midsole; and a stem positioned to impinge upon an external surface of, and at least partially deform, the conduit.
2. A sole structure comprising a midsole and a bladder network, the bladder network including first and second bladders interconnected by a conduit, at least a portion of the bladder network containing a fluid, the bladder network being embedded in and covered on top and bottom sides by the midsole, the midsole including an opening exposing the conduit.
3. The sole structure of para. 1 or para. 2, wherein the bladder network comprises multiple forefoot bladders located in a forefoot region and multiple heel bladders located in a heel region.
4. The sole structure of any preceding para., wherein the bladder network comprises bladders connected by conduits and displaced from each other in a medial-lateral direction and bladders connected by conduits and displaced from each other in a heel-toe direction.
5. The sole structure of any preceding para., wherein the bladder network comprises multiple bladders and a plurality of conduits, each of the conduits interconnecting two of the multiple bladders; and the sole structure comprises a plurality of stems, each of the stems corresponding to a different one of the conduits, each of the stems positioned to impinge upon an external surface of, and at least partially deform, its corresponding conduit.
6. The sole structure of any preceding para., wherein one stem is part of a frame, some stems are part of a frame, or all stems are part of a frame.
7. The sole structure of para. 6, wherein the frame is non-destructively removable from the sole structure.
8. The sole structure of any preceding para., wherein at least one stem includes a retaining ridge extending outward, and wherein an opening includes a wall having a recess conforming to the retaining ridge.
9. The sole structure of any preceding para., wherein a bottom side of the midsole includes a plurality of openings, wherein each of the openings is situated over a different one of multiple conduits, and wherein each of multiple stems is positioned in a different one of the openings.
10. The sole structure of any preceding para., wherein at least a portion of the bottom side of the midsole is covered by an outsole, and wherein one or more openings extend through the outsole.
11. The sole structure of any preceding para., wherein at least one stem completely closes a conduit connecting a first pair of bladders in the bladder network, and wherein at least one stem partially closes a conduit connecting a second pair of the bladders in the bladder network, and wherein at least one of the bladders in the first pair is not in the second pair.
12. The sole structure of any preceding para., wherein a pair of bladders in the bladder network is connected by two conduits, wherein one of those two conduits is pressed upon and closed by a stem, and wherein the other of those conduits is not closed by a stem.
13. The sole structure of any preceding para., wherein the bladder network comprises first and second sheets of material that is not permeable by the fluid, and wherein the bladder network includes seams bonding the first and second sheets and defining the bladders and the conduits.
14. The sole structure of any preceding para., wherein stems are non-destructively removable from the sole structure.
15. The sole structure of any preceding para., wherein the fluid comprises a gas.
16. The sole structure of any preceding para., wherein the fluid consists of a gas.
17. The sole structure of any of paras. 1 through 14, wherein the fluid comprises a liquid.
18. The sole structure of para. 17, wherein the fluid consists of a liquid.
19. An article of footwear comprising a sole structure according to any preceding para. and an upper engaged with the sole structure.
20. A method comprising receiving data for a cushioning profile of a sole structure of an article of footwear, the sole structure including a bladder network including multiple bladders interconnected by a conduit, the sole structure including an opening exposing the conduit; based on the received data, adjusting configuration of a stem; and installing the stem into the sole structure, the installing including inserting the stem through the opening so as to at least partially close at least a portion of the conduit.
21. The method of para. 20, wherein the bladder network includes multiple conduits, the sole structure includes multiple openings exposing the multiple conduits, adjusting the configuration includes adjusting the configuration of the stems, and installing the stem includes installing the stems by inserting the stems through the openings.
22. The method of para. 20 or para. 21, wherein adjusting configuration of a stem comprises 3D printing that stem to a desired length and/or trimming a stem.

The invention claimed is:
1. A method for manufacturing a customized sole structure, comprising:

receiving data for a cushioning profile of the sole structure of an article of footwear, the sole structure including a bladder network including multiple bladders interconnected by a plurality of conduits, wherein each conduit, of the plurality of conduits, interconnects a different pair of the bladders, of the multiple bladders;

forming a plurality of openings in a bottom of a midsole and extending through the bottom of the midsole and further comprising at least partially incorporating the bladder network into the midsole, wherein each of the plurality of openings corresponds to, and is positioned below, a respective conduit, of the conduits, interconnecting a pair of the bladders;

based on the received data, adjusting configurations of at least some stems in a frame; and installing the frame into the sole structure, the installing including inserting the stems downward through the openings so as to at least partially close at least a portion of the conduits, wherein each of the stems corresponds to, and is positioned in, a respective opening of the plurality of openings to control if, or how fast, fluid flows between pairs of bladders and respective conduits to control firmness when the sole structure is compressed by a wearer.

2. The method of claim 1, wherein adjusting configurations of at least some stems comprises 3D printing the at least some of the stems to desired lengths.

3. The method of claim 1, wherein adjusting configurations of at least some stems comprises, as to each of those stems, removing a portion of that stem.

4. The method of claim 1, further comprising covering at least a portion of the bottom of the midsole with an outsole, and wherein the openings extend through the outsole.

5. The method of claim 1, further comprising locating first and second bladders in a forefoot region and third and fourth bladders in a heel region, wherein the conduits comprise a first conduit interconnecting the first and second bladders and a second conduit interconnecting the third and fourth bladders, and positioning first and second openings respectively below the first and second conduits, and positioning first and second stems respectively in the first and second openings and at least partially closing the first and second conduits to at least partially restrict fluid flow between respective bladders.

6. The method of claim 1, further comprising displacing first and second bladders from each other in a medial-lateral direction and displacing third and fourth bladders from each other in a heel-toe direction, interconnecting a first conduit with the first and second bladders and a second conduit with the third and fourth bladders, and positioning first and second openings respectively below the first and second conduits, and positioning first and second stems respectively in the first and second openings and at least partially closing the first and second conduits to at least partially restrict fluid flow between respective bladders.

7. The method of claim 1, wherein the frame is removable from the sole structure without damaging the frame or the sole structure.

8. The method of claim 1, wherein each of the stems comprises a retaining ridge extending outward, wherein each of the openings comprises a wall having a recess conforming to the retaining ridge of the corresponding stem.

9. The method of claim 1, comprising forming the bladder network from first and second sheets of material that are not permeable by a fluid, and bonding the first and second sheets of material to form seams and define the multiple bladders and the conduits.

\* \* \* \* \*